US012802622B2

(12) United States Patent
Kim et al.

(10) Patent No.: US 12,802,622 B2
(45) Date of Patent: Nov. 17, 2026

(54) DISPLAY DEVICE AND ELECTRONIC DEVICE INCLUDING THE SAME

(71) Applicant: Samsung Display Co., Ltd., Yongin-Si (KR)

(72) Inventors: Eok Su Kim, Yongin-si (KR); Sunhee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/982,832

(22) Filed: Dec. 16, 2024

(65) Prior Publication Data

US 2025/0252904 A1 Aug. 7, 2025

(30) Foreign Application Priority Data

Feb. 2, 2024 (KR) ........................ 10-2024-0016527

(51) Int. Cl.
*G09G 3/32* (2016.01)

(52) U.S. Cl.
CPC ....... *G09G 3/32* (2013.01); *G09G 2300/0842* (2013.01)

(58) Field of Classification Search
CPC .......................... G09G 3/32; G09G 2300/0842
See application file for complete search history.

(56) References Cited

U.S. PATENT DOCUMENTS

| | | | | |
|---|---|---|---|---|
| 9,202,827 | B2 | 12/2015 | Koyama et al. | |
| 2020/0410926 | A1* | 12/2020 | Li | G09G 3/325 |
| 2021/0249495 | A1* | 8/2021 | Lee | G06V 40/1318 |
| 2023/0108746 | A1* | 4/2023 | Jo | H10F 39/802 345/206 |

FOREIGN PATENT DOCUMENTS

KR 10-2021-0104225 A 8/2021

* cited by examiner

*Primary Examiner* — Andrew Sasinowski
(74) *Attorney, Agent, or Firm* — Innovation Counsel LLP

(57) ABSTRACT

A display device includes a light emitting element and a driving element connected to the light emitting element and applying a driving current to the light emitting element. The driving element may include a first sub-driving element including a first gate electrode which has a first width in a first direction, and a second sub-driving element including a second gate electrode which has a second width different from the first width in the first direction and a lower metal pattern disposed under the second gate electrode.

21 Claims, 13 Drawing Sheets

DISPLAY DEVICE AND ELECTRONIC DEVICE INCLUDING THE SAME

CROSS-REFERENCE TO RELATED APPLICATION(S)

This application claims priority, under 35 U.S.C. § 119, to and benefits of Korean Patent Application No. 10-2024-0016527, filed on Feb. 2, 2024, in the Korean Intellectual Property Office (KIPO), the entire contents of which are incorporated herein by reference.

BACKGROUND

1. Technical Field

Embodiments of the present disclosure relate to a display device and an electronic device including the display device.

2. Description of the Related Art

A display device is a device that displays an image for providing visual information to a user. Among display devices, an organic light emitting diode display has recently attracted attention.

An oxide semiconductor may be formed at a low process temperature, and may be used as an active pattern of a driving element for driving each pixel of a display device because of its good mobility characteristics.

The wider the driving range of the driving element, the greater the variation in driving current in response to the driving voltage, making gradation representation easier. Therefore, it is necessary to implement a driving element having a large driving range.

SUMMARY

Embodiments of the present disclosure provide a display device including a driving element having a wide driving range.

Embodiments of the present disclosure provide an electronic device including the display device.

A display device according to an embodiment includes a light emitting element, and a driving element connected to the light emitting element and applying a driving current to the light emitting element.

In an embodiment, the driving element may include a first sub-driving element including a first gate electrode having a first width in a first direction and a second sub-driving element including a second gate electrode having a second width different from the first width in the first direction and a lower metal pattern disposed under the second gate electrode.

In an embodiment, the second width of the second gate electrode may be greater than the first width of the first gate electrode.

In an embodiment, the first sub-driving element may further include an active pattern disposed under the first gate electrode.

In an embodiment, the second sub-driving element may further include an active pattern disposed between the second gate electrode and the lower metal pattern.

In an embodiment, the lower metal pattern may not overlap the first gate electrode in a plan view.

In an embodiment, a threshold voltage of the second sub-driving element may be greater than a threshold voltage of the first sub-driving element.

In an embodiment, a difference between the threshold voltage of the second sub-driving element and the threshold voltage of the first sub-driving element may be equal to or greater than about 0.5 volts (V) and equal to or less than about 3 volts V.

In an embodiment, the first sub-driving element and the second sub-driving element may be connected in parallel.

In an embodiment, the display device may further include a source pattern disposed on the first gate electrode and the second gate electrode.

In an embodiment, the lower metal pattern may be connected to the source pattern through a contact hole.

A display device according to an embodiment includes a lower metal pattern, an active pattern disposed on the lower metal pattern, a first gate electrode disposed on the active pattern and overlapping the first channel area in a plan view, and a second gate electrode disposed on the active pattern and overlapping the second channel area in the plan view.

In an embodiment, the active pattern may include a first channel area having a first width in a first direction, and a second channel area spaced apart from the first channel area in a plan view and having a second width different from the first width in the first direction.

In an embodiment, the second gate electrode may overlap the lower metal pattern in the plan view.

In an embodiment, the first gate electrode may not overlap the lower metal pattern in the plan view.

In an embodiment, the second width of the second channel area may be greater than the first width of the first channel area.

In an embodiment, the active pattern may further include a first area in contact with the first channel area and the second channel area, and a second area in contact with the first channel area and the second channel area and is spaced apart from the first area in the plan view.

In an embodiment, the display device may further include a first sub-driving element.

In an embodiment, the first sub-driving element may include the first channel area of the active pattern, a portion of the first area of the active pattern, a portion of the second area of the active pattern, and the first gate electrode.

In an embodiment, the display device may further include a second sub-driving element.

In an embodiment, the second sub-driving element may include the second channel area of the active pattern, a portion of the first area of the active pattern, a portion of the second area of the active pattern, the second gate electrode, and a portion of the lower metal pattern overlapping the second gate electrode in the plan view.

In an embodiment, a threshold voltage of the second sub-driving element may be greater than a threshold voltage of the first sub-driving element.

In an embodiment, a difference between the threshold voltage of the second sub-driving element and the threshold voltage of the first sub-driving element may be equal to or greater than about 0.5 volts (V) and equal to or less than about 3 volts V.

In an embodiment, a width of the second gate electrode in the first direction may be greater than a width of the first gate electrode in the first direction.

An electronic device according to an embodiment includes a display device including a light emitting element, and a driving element connected to the light emitting element and applying a driving current to the light emitting element, and a memory device configured to store data.

In an embodiment, the driving element may include a first sub-driving element including a first gate electrode having a first width in a first direction and a second sub-driving element including a second gate electrode having a second width different from the first width in the first direction and a lower metal pattern disposed under the second gate electrode.

A display device according to an embodiment includes a light emitting element and a driving element configured to apply a driving current to the light emitting element. In addition, the driving element may include a first sub-driving element including a first gate electrode having a first width in a first direction and a second sub-driving element including a second gate electrode having a second width different from the first width in the first direction and a lower metal pattern disposed under the second gate electrode.

Accordingly, a driving range of the driving element may be widened, and a gradation expression of the display device may be more easily achieved.

BRIEF DESCRIPTION OF THE DRAWINGS

The above and other features of the present disclosure will become more apparent with reference to the descriptions below and the accompanying drawings.

DETAILED DESCRIPTION OF THE EMBODIMENTS

Figure 1:
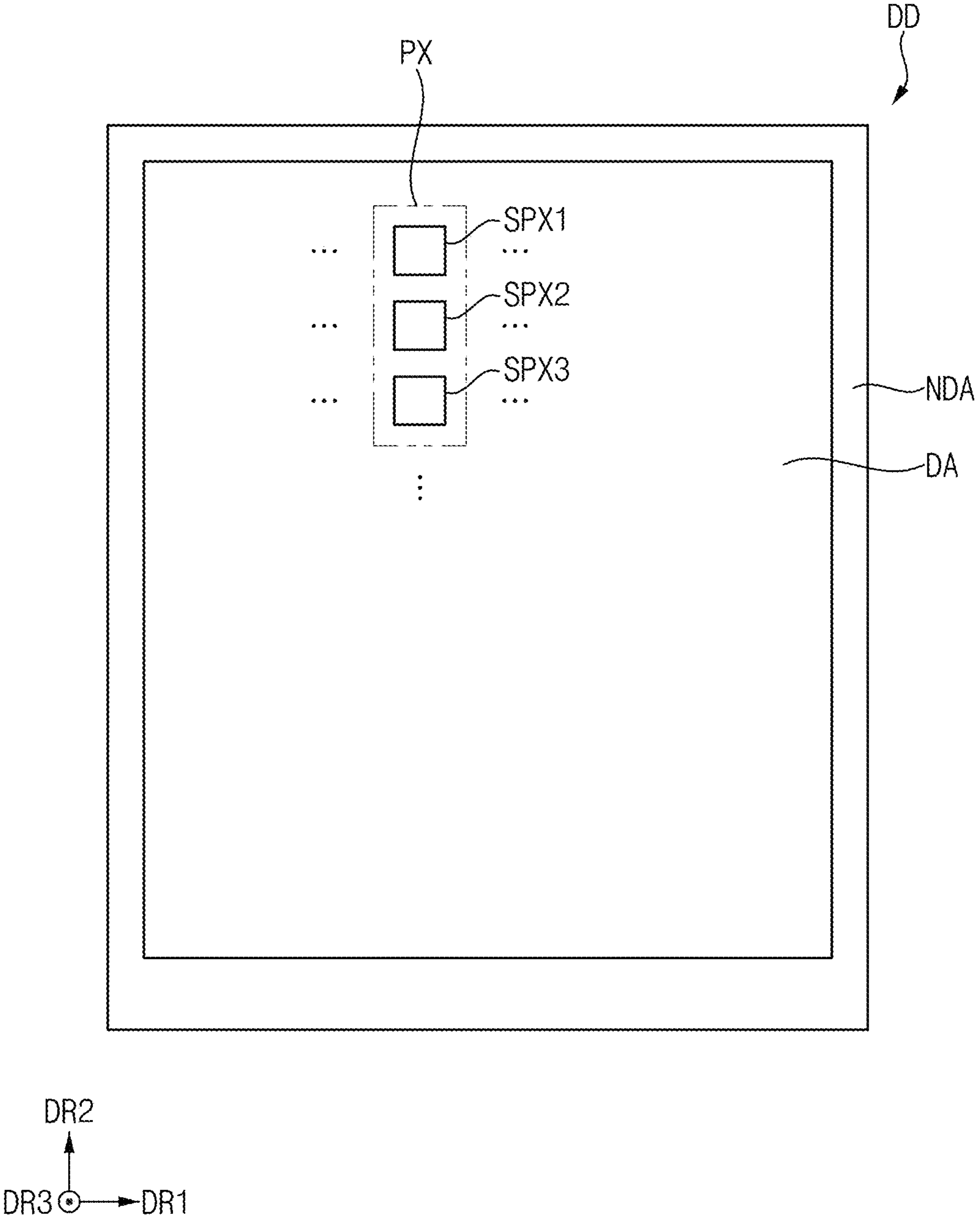
FIG. 1 is a plan view illustrating a display device according to an embodiment.

Hereinafter, display devices in accordance with embodiments will be described in more detail with reference to the accompanying drawings. The same reference numerals are used for the same components in the drawings, and redundant descriptions of the same components will be omitted.

FIG. 1 is a plan view illustrating a display device according to an embodiment.

Referring to FIG. 1, a display device DD may include a display area DA and a non-display area NDA. The display area DA may be defined as an area that emits light. The non-display area NDA may be defined as an area in which components for transmitting a signal to the display area DA are disposed.

A plurality of pixels may be disposed in the display area DA. For example, a pixel PX may be disposed in the display area DA. The plurality of pixels may be repeatedly arranged in a first direction DR1 and a second direction DR2 crossing the first direction DR1 in the display area DA.

Each of the plurality of pixels may include auxiliary pixels. For example, the pixel PX may include a first auxiliary pixel SPX1, a second auxiliary pixel SPX2, and a third auxiliary pixel SPX3. The second auxiliary pixel SPX2 may be adjacent to the first auxiliary pixel SPX1 in a direction opposite to the second direction DR2. The third auxiliary pixel SPX3 may be adjacent to the second auxiliary pixel SPX2 in a direction opposite to the second direction DR2.

Each of the first auxiliary pixel SPX1, the second auxiliary pixel SPX2, and the third auxiliary pixel SPX3 may emit light. For example, the first auxiliary pixel SPX1 may emit a first light, the second auxiliary pixel SPX2 may emit a second light, and the third auxiliary pixel SPX3 may emit a third light. For example, the first light may be red light, the second light may be green light, and the third light may be blue light. However, this disclosure is not limited thereto. For example, the first light may be green light, the second light may be red light, and the third light may be blue light.

The non-display area NDA may be disposed around the display area DA. For example, the non-display area NDA may surround at least a portion of the display area DA. The non-display area NDA may be an area that does not display an image.

In the present disclosure, a first direction DR1 and a second direction DR2 crossing the first direction DR1 may be defined. For example, the second direction DR2 may be perpendicular to the first direction DR1. However, this disclosure is not limited thereto, and the second direction DR2 may form an acute angle or an obtuse angle with the first direction DR1. In addition, a third direction DR3 crossing a plane formed by the first direction DR1 and the second direction DR2 may be defined. For example, the third direction DR3 may be perpendicular to the plane formed by the first direction DR1 and second direction DR2. However, this disclosure is not limited thereto, and the third direction DR3 may form an acute angle or an obtuse angle with the plane formed by the first direction and second direction DR2.

Figure 2:
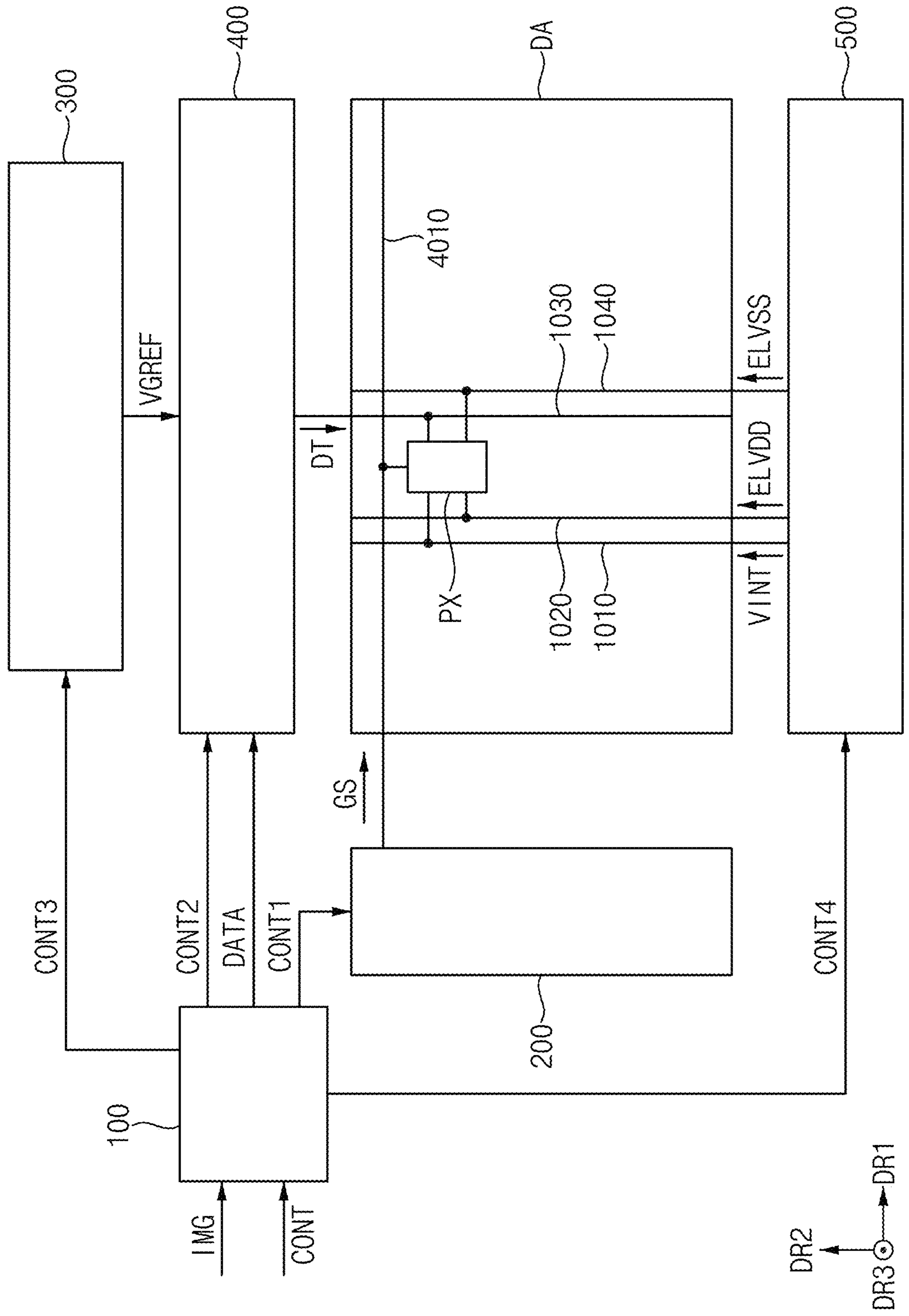
FIG. 2 is a block diagram illustrating the display device of FIG. 1.

FIG. 2 is a block diagram illustrating the display device of FIG. 1.

Referring to FIGS. 1 and 2, the non-display area NDA may include a driver. The driver may include a driving controller 100, a gate driver 200, a gamma reference voltage generator 300, a data driver 400, and a voltage supplier 500.

The display area DA may include a first source pattern 4010, an initialization voltage wiring 1010, a first power voltage wiring 1020, a data wiring 1030, a second power voltage wiring 1040, and a plurality of pixels. Each of the plurality of pixels may be electrically connected to the first source pattern 4010, the initialization voltage wiring 1010, the first power voltage wiring 1020, the data wiring 1030, and the second power voltage wiring 1040. For example, the pixel PX may be electrically connected to the first source pattern 4010, the initialization voltage wiring 1010, the first power voltage wiring 1020, the data wiring 1030, and the second power voltage wiring 1040.

For example, the first source pattern 4010 may extend in the first direction DR1, and each of the initialization voltage wiring 1010, the first power voltage wiring 1020, the data wiring 1030, and the second power voltage wiring 1040 may extend in the second direction DR2.

The driving controller 100 may receive input image data IMG and an input control signal CONT from an external device. In an embodiment, the input image data IMG may include red image data, green image data and blue image data. In an embodiment, the input image data IMG may include white image data. In an embodiment, the input image data IMG may include magenta image data, yellow image data, and cyan image data.

The input control signal CONT may include a master clock signal and a data enable signal. The input control signal CONT may further include a vertical synchronization signal and a horizontal synchronization signal.

The driving controller 100 may generate a first control signal CONT1, a second control signal CONT2, a third control signal CONT3, a fourth control signal CONT4, and a data signal DATA based on the input image data IMG and the input control signal CONT.

The driving controller 100 may generate the first control signal CONT1 for controlling an operation of the gate driver 200 based on the input control signal CONT and output the first control signal CONT1 to the gate driver 200. The first control signal CONT1 may include a vertical start signal and a gate clock signal.

The driving controller 100 may generate the second control signal CONT2 for controlling an operation of the data driver 400 based on the input control signal CONT and output the second control signal CONT2 to the data driver 400. The second control signal CONT2 may include a horizontal start signal and a load signal.

The driving controller 100 may generate the third control signal CONT3 for controlling an operation of the gamma reference voltage generator 300 based on the input control signal CONT and output the third control signal CONT3 to the gamma reference voltage generator 300.

The driving controller 100 may generate the fourth control signal CONT4 for controlling an operation of the voltage supplier 500 based on the input control signal CONT and output the fourth control signal CONT4 to the voltage supplier 500.

The driving controller 100 may generate the data signal DATA based on the input image data IMG. The driving controller 100 may output the data signal DATA to the data driver 400.

The gate driver 200 may generate a gate signal GS. The gate driver 200 may provide the gate signal GS to the pixel PX through the first source pattern 4010.

The gamma reference voltage generator 300 may generate a gamma reference voltage VGREF. The gamma reference voltage generator 300 may provide the gamma reference voltage VGREF to the data driver 400. The gamma reference voltage VGREF may have a value corresponding to the data signal DATA.

The data driver 400 may convert the data signal DATA into an analog data voltage using the gamma reference voltage VGREF. For example, the data driver 400 may generate the data voltage DT. The data driver 400 may provide the data voltage DT to the pixel PX through the data wiring 1030.

The voltage supplier 500 may generate an initialization voltage VINT, a first power voltage ELVDD, and a second power voltage ELVSS. The voltage supplier 500 may provide the initialization voltage VINT to the pixel PX through the initialization voltage wiring 1010. The voltage supplier 500 may provide the first power voltage ELVDD to the pixel PX through the first power voltage wiring 1020. The voltage supplier 500 may provide the second power voltage ELVSS to the pixel PX through the second power voltage wiring 1040.

In an embodiment, the gate driver 200 may be adjacent to the display area DA in a direction opposite to the first direction DR1, and the voltage supplier 500 may be adjacent to the display area DA in a direction opposite to the second direction DR2. However, this disclosure is not limited thereto. For example, both the gate driver 200 and the voltage supplier 500 may be adjacent to the display area DA in a direction opposite to the first direction DR1. For example, the gate driver 200 and the voltage supplier 500 may be integrally formed.

Figure 3:
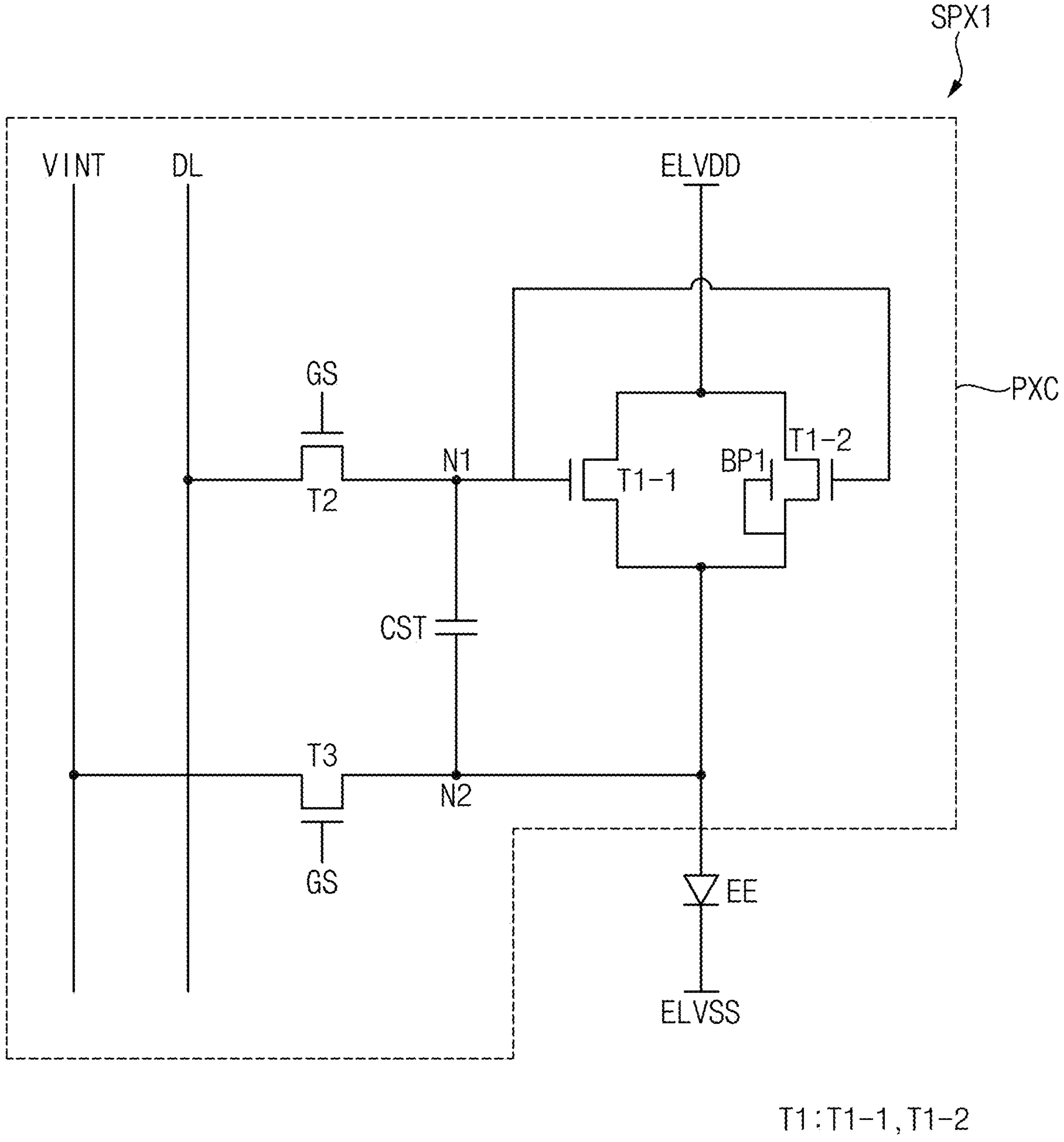
FIG. 3 is a circuit diagram illustrating a first auxiliary pixel included in the display device of FIG. 1.

FIG. 3 is a circuit diagram illustrating a first auxiliary pixel included in the display device of FIG. 1.

Referring to FIG. 3, the first auxiliary pixel SPX1 may include a pixel circuit PXC and a light emitting element EE. The pixel circuit PXC may include a driving element T1, a switching element T2, an initialization element T3, and a capacitor CST.

The driving element T1 may apply a driving current to the light emitting element EE. In an embodiment, the driving element T1 may include a first sub-driving element T1-1 and a second sub-driving element T1-2. For example, the first sub-driving element T1-1 and the second sub-driving element T1-2 may be connected in parallel.

The first sub-driving element T1-1 may include a first electrode, a second electrode, and a gate electrode. The first power voltage EVLDD may be applied to the first electrode of the first sub-driving element T1-1. The gate electrode of the first sub-driving element T1-1 may be connected to a first node N1. The second electrode of the first sub-driving element T1-1 may be connected to the light emitting element EE.

The first sub-driving element T1-1 may provide a first driving current to the light emitting element EE based on the first power voltage ELVDD and the data voltage DT. For example, when a gate-source voltage ("Vgs") of the first sub-driving element T1-1 is greater than a first threshold voltage of the first sub-driving element T1-1, the first sub-driving element T1-1 may generate the first driving current.

The second sub-driving element T1-2 may include a first electrode, a second electrode, a gate electrode, and a first lower metal pattern BP1. The first power voltage EVLDD may be applied to the first electrode of the second sub-driving element T1-2. The gate electrode of the second sub-driving element T1-2 may be connected to the first node N1. The second electrode of the second sub-driving element T1-2 may be connected to the light emitting element EE. The first lower metal pattern BP1 of the second sub-driving element T1-2 may overlap the gate electrode of the second sub-driving element T1-2 in a plan view. For example, the first lower metal pattern BP1 of the second sub-driving element T1-2 may overlap the gate electrode of the second sub-driving element T1-2 in the plan view with a buffer layer (for example, a buffer layer BUF of FIG. 11) interposed therebetween.

The second sub-driving element T1-2 may provide a second driving current to the light emitting element EE based on the first power voltage ELVDD and the data voltage DT. For example, when a gate-source voltage ("Vgs") of the second sub-driving element T1-2 is greater than a second threshold voltage of the second sub-driving element T1-2, the second sub-driving element T1-2 may generate the second driving current.

The switching element T2 may include a first electrode, a second electrode, and a gate electrode. The data voltage DT may be applied to the first electrode of the switching element T2. The second electrode of the switching element T2 may be connected to the first node N1. The gate signal GS may be applied to the gate electrode of the switching element T2.

The switching element T2 may be turned on or off in response to the gate signal GS. During a period in which the switching element T2 is turned on, the switching element T2 may apply the data voltage DT to the first sub-driving element T1-1 and the second sub-driving element T1-2.

The initialization element T3 may include a first electrode, a second electrode, and a gate electrode. The initialization voltage VINT may be applied to the first electrode of the initialization element T3. The second electrode of the initialization element T3 may be connected to a second node N2. The gate signal GS may be applied to the gate electrode of the initialization element T3.

The initialization element T3 may be turned on or off in response to the gate signal GS. During a period in which the initialization element T3 is turned on, the initialization element T3 may apply the initialization voltage VINT to the first sub-driving element T1-1 and the second sub-driving element T1-2.

In an embodiment, each of the driving element T1, the switching element T2, and the initialization element T3 may be an NMOS transistor. That is, each of an active pattern (e.g., a first active pattern 2010 of FIG. 5) of the driving element T1, an active pattern (e.g., a third active pattern 2030 of FIG. 5) of the switching element T2, and an active pattern (e.g., a second active patterns 2020 of FIG. 5) of the initialization element T3 may include an oxide semiconductor. However, this disclosure is not limited thereto, and in an embodiment, each of the driving element T1, the switching element T2, and the initialization element T3 may be a PMOS transistor. In an embodiment, some of the driving element T1, the switching element T2, and the initialization element T3 may be NMOS transistors, and the others may be PMOS transistors.

The capacitor CST may include a first electrode and a second electrode. The first electrode of the capacitor CST may be connected to the first node N1. The second electrode of the capacitor CST may be connected to the second node N2. The capacitor CST may maintain a voltage level of the gate electrode of the driving element T1 during a deactivation period of the gate signal GS.

The light emitting element EE may include a first electrode and a second electrode. The first electrode of the light emitting element EE may be connected to the second electrode of the first sub-driving element T1-1 and the second electrode of the second sub-driving element T1-2. The second power voltage ELVSS may be applied to the second electrode of the light emitting element EE. The light emitting element EE may emit light having luminance corresponding to a sum of the first driving current and the second driving current.

FIGS. 4, 5, 6, 7, 8, 9, and 10 are layout views illustrating pixels included in the display device of FIG. 1.

The pixel PX of FIG. 1 may include a pixel circuit. FIGS. 4, 5, 6, 7, 8, 9, and 10 may be layout views illustrating the pixel circuit of the pixel PX.

Figure 4:
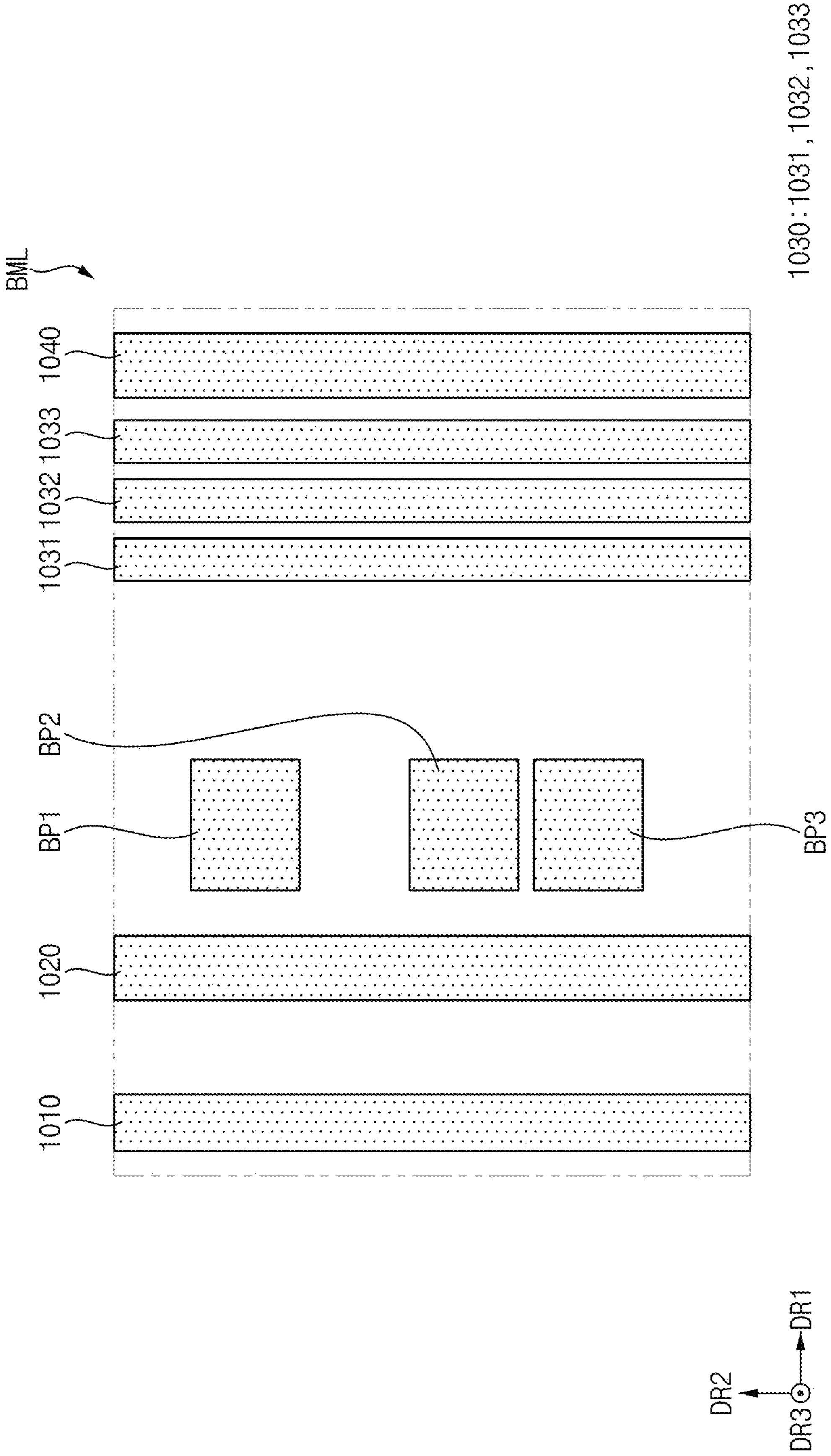
FIG. 4 is a layout illustrating a lower metal layer included in a pixel of the display device according to FIG. 1.

Referring to FIG. 4, the display device (e.g., the display device DD of FIG. 1) may include a lower metal layer BML. The lower metal layer BML may include a first lower metal pattern BP1, a second lower metal pattern BP2, a third lower metal pattern BP3, an initialization voltage wiring 1010, a first power voltage wiring 1020, a data wiring 1030, and a second power voltage wiring 1040.

The first lower metal pattern BP1 and the second lower metal pattern BP2 may be spaced apart from each other in the plan view. For example, the second lower metal pattern BP2 may be spaced apart from the first lower metal pattern BP1 in a direction opposite to the second direction DR2. The second lower metal pattern BP2 and the third lower metal pattern BP3 may be spaced apart from each other. For example, the third lower metal pattern BP3 may be spaced apart from the second lower metal pattern BP2 in a direction opposite to the second direction DR2.

The initialization voltage wiring 1010 may extend in the second direction DR2. The initialization voltage (e.g., the initialization voltage VINT of FIG. 2) may be applied to the initialization voltage wiring 1010.

The first power voltage wiring 1020 may extend in the second direction DR2. For example, the first power voltage wiring 1020 may be spaced apart from the initialization voltage wiring 1010 in the first direction DR1. The first power voltage (e.g., the first power voltage ELVDD of FIG. 2) may be applied to the first power voltage wiring 1020.

The data voltage (e.g., the data voltage DT of FIG. 2) may be applied to the data wiring 1030. The data wiring 1030 may include a plurality of data wirings. For example, the data wiring 1030 may include a first data wiring 1031, a second data wiring 1032, and a third data wiring 1033.

For example, a red data voltage may be applied to the first data wiring 1031, a green data voltage may be applied to the second data wiring 1032, and a blue data voltage may be applied to the third data wiring 1033. However, this disclosure is not limited thereto. For example, the green data voltage may be applied to the first data wiring 1031, the red data voltage may be applied to the second data wiring 1032, and the blue data voltage may be applied to the third data wiring 1033. And each of the red data voltage, the green data voltage, and the blue data voltage may be applied through a single data wiring.

Each of the first data wiring 1031, the second data wiring 1032, and the third data wiring 1033 may extend in the second direction DR2. For example, the second data wiring 1032 may be spaced apart from the first data wiring 1031 in the first direction DR1, and the third data wiring 1033 may be spaced apart from the second data wiring 1032 in the first direction DR1.

The second power voltage wiring 1040 may extend in the second direction DR2. For example, the second power voltage wiring 1040 may be spaced apart from the third data wiring 1033 in the first direction DR1. The second power voltage (e.g., the second power voltage ELVSS of FIG. 2) may be applied to the second power voltage wiring 1040.

For example, the lower metal layer BML may include an alloy, a metal nitride, a conductive metal oxide, a transparent conductive material, or the like. These materials may be used alone or in combination with each other.

Examples of the metal included in the lower metal layer BML may include silver ("Ag"), molybdenum ("Mo"), aluminum ("Al"), tungsten ("W"), copper ("Cu"), nickel ("Ni"), chromium ("Cr"), titanium ("Ti"), tantalum ("Ta"), platinum ("Pt"), scandium ("Sc"), or the like. These materials may be used alone or in combination with each other.

Examples of the metal nitride included in the lower metal layer BML may include aluminum nitride ("$AlN_x$"), tungsten nitride ("$WN_x$"), chromium nitride ("$CrN_x$"), or the like. These materials may be used alone or in combination with each other.

Examples of the conductive metal oxide included in the lower metal layer BML may include indium tin oxide, indium zinc oxide, or the like. These materials may be used alone or in combination with each other.

Figure 5:
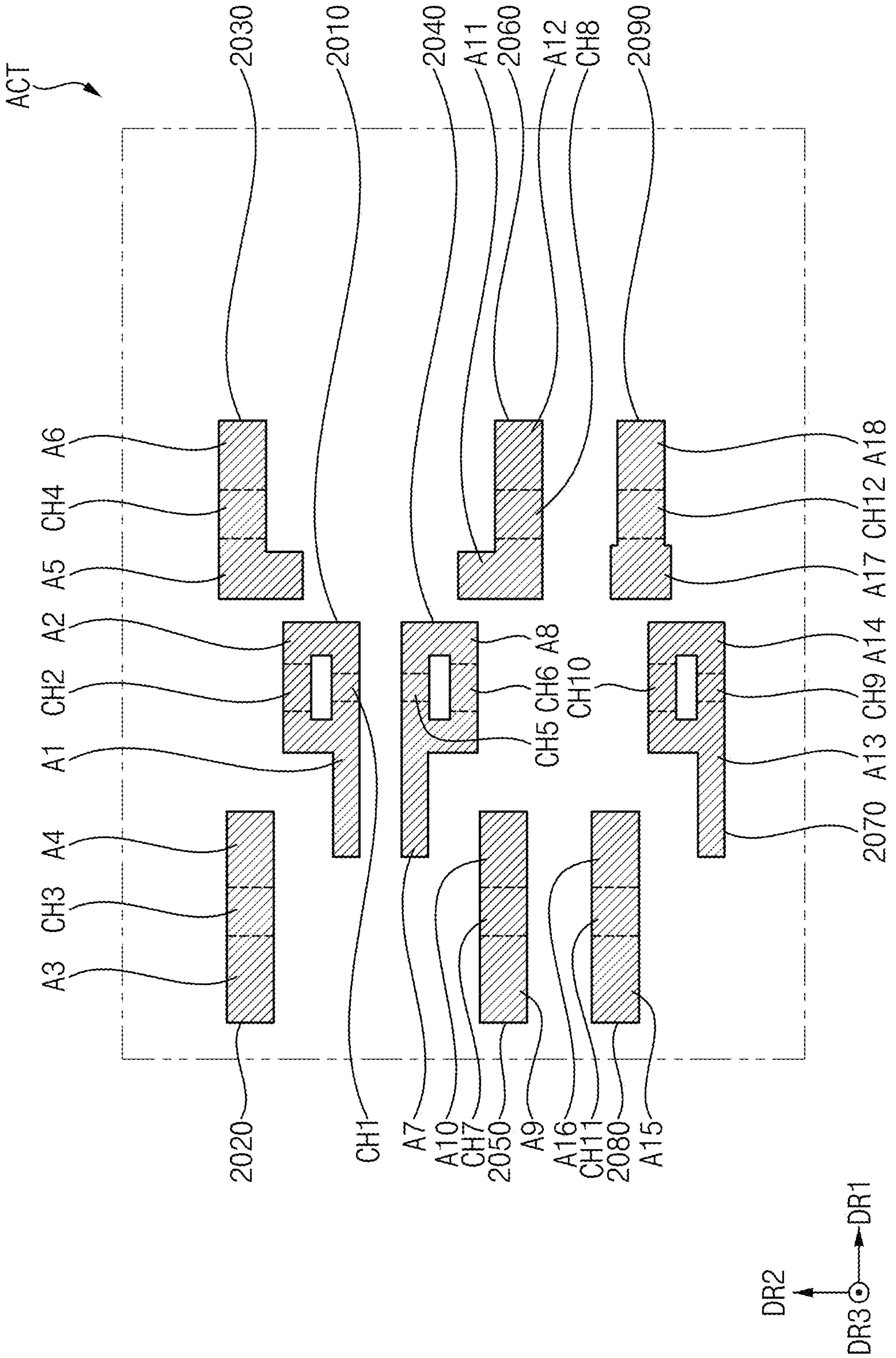
FIG. 5 is a layout illustrating an active layer included in the pixel of the display device according to FIG. 1.
Figure 6:
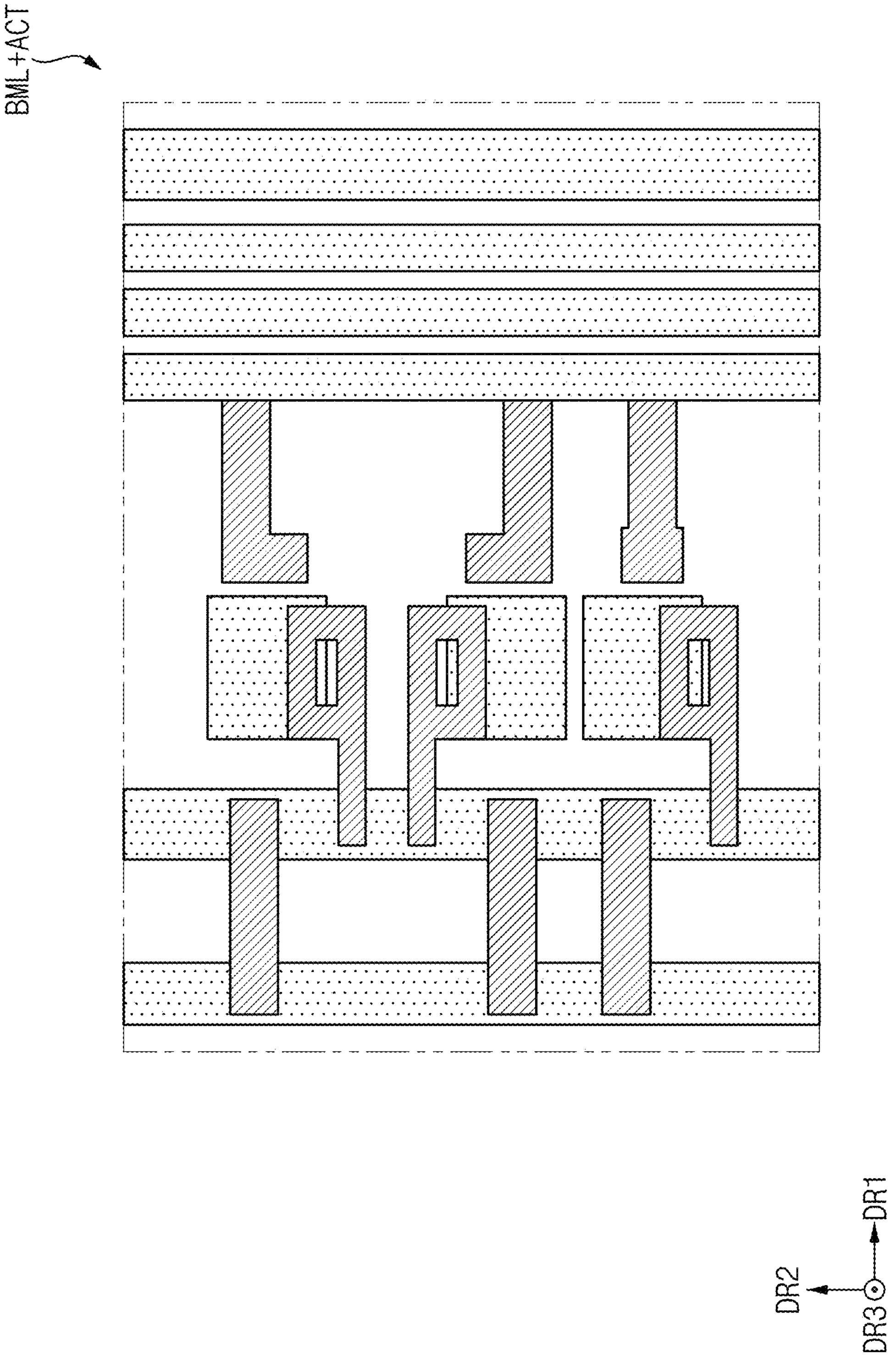
FIG. 6 is a layout illustrating the lower metal layer and the active layer included in the pixel of the display device according to FIG. 1.

Referring to FIGS. 4, 5, and 6, an active layer ACT may be disposed on the lower metal layer BML. The active layer ACT may include a first active pattern 2010, a second active pattern 2020, a third active pattern 2030, a fourth active pattern 2040, a fifth active pattern 2050, a sixth active pattern 2060, a seventh active pattern 2070, an eighth active pattern 2080, and a ninth active pattern 2090.

The first active pattern 2010 may include a first area A1, a first channel area CH1, a second area A2, and a second channel area CH2. The first area A1 may be in contact with the first channel area CH1 and the second channel area CH2. The second area A2 may be in contact with the first channel area CH1 and the second channel area CH2. The second area A2 may be spaced apart from the first area A1 in the plan view. For example, the second area A2 may be spaced apart from the first area A1 in the first direction DR1. The second channel area CH2 may be spaced apart from the first channel area CH1 in the plan view. For example, the second channel area CH2 may be spaced apart from the first channel area CH1 in the second direction DR2.

The second active pattern 2020 may include a third area A3, a third channel area CH3, and a fourth area A4. The third channel area CH3 may be in contact with the third area A3 in the first direction DR1. The third channel area CH3 may be in contact with the fourth area A4 in a direction opposite to the first direction DR1. That is, the third channel area CH3 may be disposed between the third area A3 and the fourth area A4.

The third active pattern 2030 may include a fifth area A5, a fourth channel area CH4, and a sixth area A6. The fourth channel area CH4 may be in contact with the fifth area A5 in the first direction DR1. The fourth channel area CH4 may be in contact with the sixth area A6 in a direction opposite to the first direction DR1. That is, the fourth channel area CH4 may be disposed between the fifth area A5 and the sixth area A6.

The fourth active pattern 2040 may include a seventh area A7, a fifth channel area CH5, an eighth area A8, and a sixth channel area CH6. The seventh area A7 may be in contact with the fifth channel area CH5 and the sixth channel area CH6. The eighth area A8 may be in contact with the fifth channel area CH5 and the sixth channel area CH6. The eighth area A8 may be spaced apart from the seventh area A7 in the plan view. For example, the eighth area A8 may be spaced apart from the seventh area A7 in the first direction DR1. The sixth channel area CH6 may be spaced apart from the fifth channel area CH5 in the plan view. For example, the sixth channel area CH6 may be spaced apart from the fifth channel area CH5 in a direction opposite to the second direction DR2.

The fifth active pattern 2050 may include a ninth area A9, a seventh channel area CH7, and a tenth area A10. The seventh channel area CH7 may be in contact with the ninth area A9 in the first direction DR1. The seventh channel area CH7 may be in contact with the tenth area A10 in a direction opposite to the first direction DR1. That is, the seventh channel area CH7 may be disposed between the ninth area A9 and the tenth area A10.

The sixth active pattern 2060 may include an eleventh area A11, an eighth channel area CH8, and a twelfth area A12. The eighth channel area CH8 may be in contact with the eleventh area A11 in the first direction DR1. The eighth channel area CH8 may be in contact with the twelfth area A12 in a direction opposite to the first direction DR1. That is, the eighth channel area CH8 may be disposed between the eleventh area A11 and the twelfth area A12.

The seventh active pattern 2070 may include a thirteenth area A13, a ninth channel area CH9, a fourteenth area A14, and a tenth channel area CH10. The thirteenth area A13 may be in contact with the ninth channel area CH9 and the tenth channel area CH10. The fourteenth area A14 may be in contact with the ninth channel area CH9 and the tenth channel area CH10. The fourteenth area A14 may be spaced apart from the thirteenth area A13 in the plan view. For example, the fourteenth area A14 may be spaced apart from the thirteenth area A13 in the first direction DR1. The tenth channel area CH10 may be spaced apart from the ninth channel area CH9 in the plan view. For example, the tenth channel area CH10 may be spaced apart from the ninth channel area CH9 in a second direction DR2.

The eighth active pattern 2080 may include a fifteenth area A15, an eleventh channel area CH11, and a sixteenth area A16. The eleventh channel area CH11 may be in contact with the fifteenth area A15 in the first direction DR1. The eleventh channel area CH11 may be in contact with the sixteenth area A16 in a direction opposite to the first direction DR1. That is, the eleventh channel area CH11 may be disposed between the fifteenth area A15 and the sixteenth area A16.

The ninth active pattern 2090 may include a seventeenth area A17, a twelfth channel area CH12, and an eighteenth area A18. The twelfth channel area CH12 may be in contact with the seventeenth area A17 in the first direction DR1. The twelfth channel area CH12 may be in contact with the eighteenth area A18 in a direction opposite to the first direction DR1. That is, the twelfth channel area CH12 may be disposed between the seventeenth area A17 and the eighteenth area A18.

The active layer ACT may include an oxide semiconductor. In an embodiment, the active layer ACT may include an n-type semiconductor. For example, the active layer ACT may include zinc oxide ("ZnO"), indium oxide ("$In_2O_3$"), Indium zinc oxide ("IZO"), zinc tin oxide ("ZTO"), indium gallium zinc oxide ("IGZO"), indium tin zinc oxide ("ITZO"), gallium zinc oxide ("GZO"), indium tin oxide ("ITO"), hafnium indium zinc oxide ("HIZO"), tin oxide ("$SnO_2$"), or the like. These materials may be used alone or in combination with each other.

However, this disclosure is not limited thereto, and in an embodiment, the active layer ACT may include a p-type semiconductor. For example, the active layer ACT may include tin oxide ("SnO"), copper oxide ("$Cu_2O$"), or the like. These materials may be used alone or in combination with each other.

In an embodiment, the active layer ACT may further include indium ("In"), gallium ("Ga"), tin ("Sn"), zirconium ("Zr"), vanadium ("V"), hafnium ("Hf"), cadmium ("Cd"), germanium ("Ge"), chromium ("Cr"), titanium ("Ti"), zinc ("Zn"), or the like. These materials may be used alone or in combination.

Figure 7:
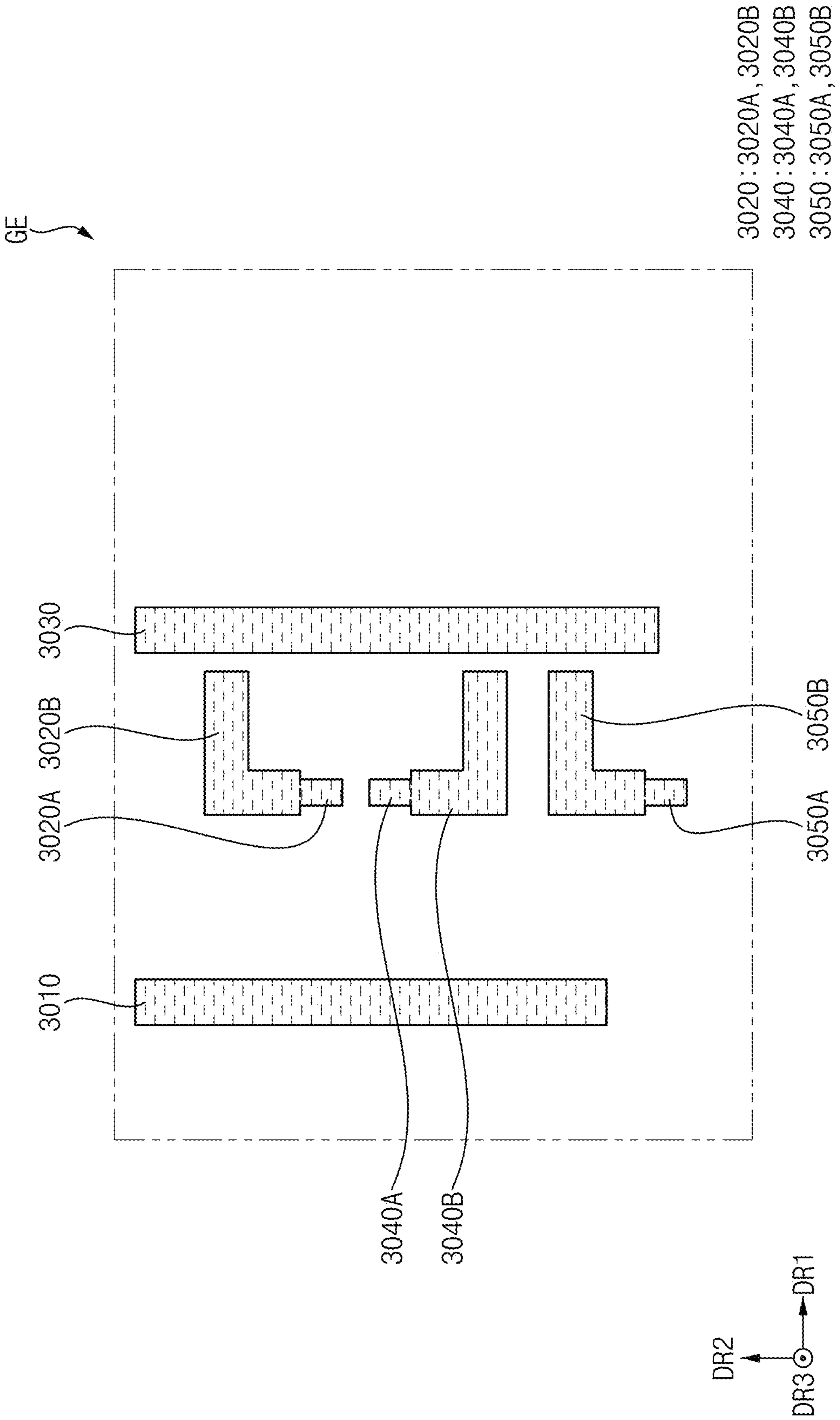
FIG. 7 is a layout illustrating a gate layer included in the pixel of the display device according to FIG. 1.
Figure 8:
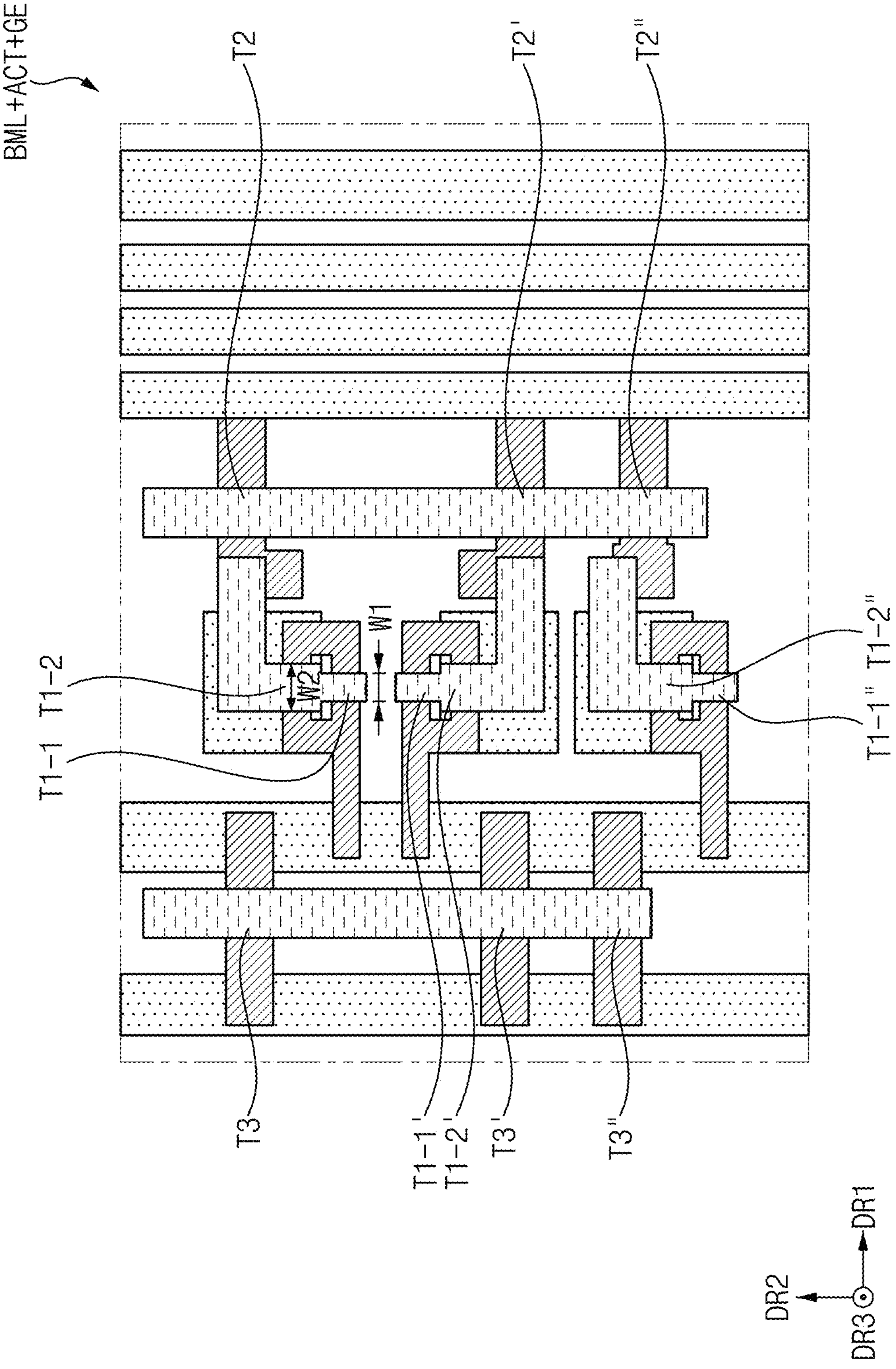
FIG. 8 is a layout illustrating the lower metal layer, the active layer, and the gate layer included in the pixel of the display device according to FIG. 1.

Referring to FIGS. 6, 7, and 8, a gate layer GE may be disposed on the active layer ACT. The gate layer GE may include a first gate pattern 3010, a second gate pattern 3020, a third gate pattern 3030, a fourth gate pattern 3040, and a fifth gate pattern 3050.

For example, the first gate pattern 3010 may extend in the second direction DR2. The first gate pattern 3010 may be spaced apart from the second gate pattern 3020, the fourth gate pattern 3040, and the fifth gate pattern 3050 in a direction opposite to the first direction DR1.

The second gate pattern 3020 may include a 2-1 gate pattern 3020A and a 2-2 gate pattern 3020B. The 2-1 gate pattern 3020A may extend from one end of the 2-2 gate pattern 3020B in a direction opposite to the second direction DR2. For example, the 2-1 gate pattern 3020A and the 2-2 gate pattern 3020B may be integrally formed.

For example, the third gate pattern 3030 may extend in the second direction DR2. The third gate pattern 3030 may be spaced apart from the second gate pattern 3020, the fourth gate pattern 3040, and the fifth gate pattern 3050 in the first direction DR1.

The fourth gate pattern 3040 may include a 4-1 gate pattern 3040A and a 4-2 gate pattern 3040B. The 4-1 gate pattern 3040A may extend from one end of the 4-2 gate pattern 3040B in the second direction DR2. For example, the 4-1 gate pattern 3040A and the 4-2 gate pattern 3040B may be integrally formed.

The fifth gate pattern 3050 may include a 5-1 gate pattern 3050A and a 5-2 gate pattern 3050B. The 5-1 gate pattern 3050A may extend from one end of the 5-2 gate pattern 3050B in a direction opposite to the second direction DR2. For example, the 5-1 gate pattern 3050A and the 5-2 gate pattern 3050B may be integrally formed.

For example, the gate layer BML may include an alloy, a metal nitride, a conductive metal oxide, a transparent conductive material, or the like. These materials may be used alone or in combination with each other.

Examples of the metal included in the gate layer BML may include silver ("Ag"), molybdenum ("Mo"), aluminum ("Al"), tungsten ("W"), copper ("Cu"), nickel ("Ni"), chromium ("Cr"), titanium ("Ti"), tantalum ("Ta"), platinum ("Pt"), scandium ("Sc"), or the like. These materials may be used alone or in combination with each other.

Examples of the metal nitride included in the gate layer BML may include aluminum nitride ("$AlN_x$"), tungsten nitride ("$WN_x$"), chromium nitride ("$CrN_x$"), or the like. These materials may be used alone or in combination with each other.

Examples of the conductive metal oxide included in the gate layer BML may include indium tin oxide, indium zinc oxide, or the like. These materials may be used alone or in combination with each other.

Referring further to FIG. 5, the first sub-driving element T1-1 may include a portion of the first active pattern 2010 (i.e., a portion of the first area A1, a portion of the second area A2, and the first channel area CH1) and a portion of the 2-1 gate pattern 3020A overlapping the first channel area CH1 of the first active pattern 2010 in the plan view. For example, the portion of the 2-1 gate pattern 3020A overlapping the first channel area CH1 of the first active pattern 2010 in the plan view may be referred to as a first gate electrode.

The second sub-driving element T1-2 may include a portion of the first active pattern 2010 (i.e., a portion of the first area A1, a portion of the second area A2, and the second channel area CH2), a portion of the 2-2 gate pattern 3020B overlapping the second channel area CH2 of the first active pattern 2010 in the plan view, and a portion of the first lower metal pattern (e.g., the first lower metal pattern BP1 of FIG. 4) overlapping the first active pattern 2010 in the plan view. For example, the portion of the 2-2 gate pattern 3020B overlapping the second channel area CH2 of the first active pattern 2010 in the plan view may be referred to as a second gate electrode.

The switching element T2 may include a portion of the third active pattern 2030 (i.e., a portion of the fifth area A5, a portion of the sixth area A6, and the fourth channel area CH4) and a portion of the third gate pattern 3030 overlapping the fourth channel area CH4 of the third active pattern 2030 in the plan view.

The initialization element T3 may include a portion of the second active pattern 2020 (i.e., a portion of the third area A3, a portion of the fourth area A4, and the third channel area CH3) and a portion of the first gate pattern 3010 overlapping the third channel area CH3 of the second active pattern 2020 in the plan view.

The first sub-driving element T1-1, the second sub-driving element T1-2, the switching element T2, and the initialization element T3 of FIG. 8 may be elements included in the pixel circuit of the first auxiliary pixel SPX1 of FIG. 1.

A first sub-driving element T1-1' may include a portion of the fourth active pattern 2040 (i.e., a portion of the seventh area A7, a portion of the eighth area A8, and the fifth channel area CH5) and a portion of the 4-1 gate pattern 3040A overlapping the fifth channel area CH5 of the fourth active pattern 2040 in the plan view.

A second sub-driving element T1-2' may include a portion of the fourth active pattern 2040 (i.e., a portion of the seventh area A7, a portion of the eighth area A8, and the sixth channel area CH6), a portion of the 4-2 gate pattern 3040B overlapping the sixth channel area CH6 of the fourth active pattern 2040, and a portion of the second lower metal pattern (e.g., the second lower metal pattern BP2 of FIG. 4) overlapping the fourth active pattern 2040 in the plane view.

A switching element T2' may include a portion of the sixth active pattern 2060 (i.e., a portion of the eleventh area A11, a portion of the twelfth area A12, and the eighth channel area CH8) and a portion of the third gate pattern 3030 overlapping the eighth channel area CH8 of the sixth active pattern 2060 in the plan view.

An initialization element T3' may include a portion of the fifth active pattern 2050 (i.e., a portion of the ninth area A9, a portion of the tenth area A10, and the seventh channel area CH7) and a portion of the first gate pattern 3010 overlapping the seventh channel area CH7 of fifth active pattern 2050 in the plan view.

The first sub-driving element T1-1', the second sub-driving element T1-2', the switching element T2', and the initialization element T3' of FIG. 8 may be elements included in a pixel circuit of the second auxiliary pixel SPX2 of FIG. 1.

A first sub-driving element T1-1" may include a portion of the seventh active pattern 2070 (i.e., a portion of the thirteenth area A13, a portion of the fourteenth area A14, and the ninth channel area CH9) and a portion of the 5-1 gate pattern 3050A overlapping the ninth channel area CH9 of the seventh active pattern 2070 in the plan view.

A second sub-driving element T1-2" may include a portion of the seventh active pattern 2070 (i.e., a portion of the thirteenth area A13, a portion of the fourteenth area A14, and the tenth channel area CH10), a portion of the 5-2 gate pattern 3050B overlapping the tenth channel area CH10 of the seventh active pattern 2070 in the plan view, and a portion of the third lower metal pattern (e.g., the third lower metal pattern BP3 of FIG. 4) overlapping the seventh active pattern 2070 in the plan view.

A switching element T2" may include a portion of the ninth active pattern 2090 (i.e., a portion of the seventeenth area A17, a portion of the eighteenth area A18, and the twelfth channel area CH12) and a portion of the third gate pattern 3030 overlapping the twelfth channel area CH12 of the ninth active pattern 2090 in the plan view.

An initialization element T3" may include a portion of the eighth active pattern 2080 (i.e., a portion of the fifteenth area A15, a portion of the sixteenth area A16, and the eleventh channel area CH11) and the first gate pattern 3010 overlapping the eleventh channel area CH11 of the eighth active pattern 2080 in the plan view.

The first sub-driving element T1-1", the second sub-driving element T1-2", the switching element T2", and the initialization element T3" of FIG. 8 may be elements included in a pixel circuit of the third auxiliary pixel SPX3 of FIG. 1.

The portion of the 2-1 gate pattern 3020A overlapping the first channel area CH1 of the first active pattern 2010 in the plan view may have a first width W1. For example, the portion of the 2-1 gate pattern 3020A overlapping the first channel area CH1 of the first active pattern 2010 in the plan view may have the first width W1 in the first direction DR1. That is, the first channel area CH1 of the first active pattern 2010 may have the first width W1 in the first direction DR1.

The portion of the 2-2 gate pattern 3020B overlapping the second channel area CH2 of the first active pattern 2010 in the plan view may have a second width W2. For example, the portion of the 2-2 gate pattern 3020B overlapping the second channel area CH2 of the first active pattern 2010 in the plan view may have the second width W2 in the first direction DR1. That is, the second channel area CH2 of the first active pattern 2010 may have the second width W2 in the first direction DR1.

In an embodiment, the second width W2 may be greater than the first width W1. That is, the second width W2 of the second gate electrode in the first direction DR1 may be greater than the first width W1 of the first gate electrode in the first direction DR1.

The portion of the 4-1 gate pattern 3040A overlapping the fifth channel area CH5 of the fourth active pattern 2040 in the plan view may have a first width. For example, the portion of the 4-1 gate pattern 3040A overlapping the fifth channel area CH5 of the fourth active pattern 2040 in the plan view may have the first width in the first direction DR1. That is, the fifth channel area CH5 of the fourth active pattern 2040 may have the first width in the first direction DR1.

The portion of the 4-2 gate pattern 3040B overlapping the sixth channel area CH6 of the fourth active pattern 2040 in the plan view may have a second width. For example, the portion of the 4-2 gate pattern 3040B overlapping the sixth channel area CH6 of the fourth active pattern 2040 in the plan view may have the second width in the first direction DR1. That is, the sixth channel area CH6 of the fourth active pattern 2040 may have the second width in the first direction DR1.

In an embodiment, the second width of the 4-2 gate pattern 3040B may be greater than the first width of the 4-1 gate pattern 3040A.

The portion of the 5-1 gate pattern 3050A overlapping the ninth channel area CH9 of the seventh active pattern 2070 in the plan view may have a first width. For example, the portion of the 5-1 gate pattern 3050A overlapping the ninth channel area CH9 of the seventh active pattern 2070 in the plan view may have the first width in the first direction DR1. That is, the ninth channel area CH9 of the seventh active pattern 2070 may have the first width in the first direction DR1.

The portion of the 5-2 gate pattern 3050B overlapping the tenth channel area CH10 of the seventh active pattern 2070 in the plan view may have a second width. For example, the portion of the 5-2 gate pattern 3050B overlapping the tenth channel area CH10 of the seventh active pattern 2070 in the plan view may have the second width in the first direction DR1. That is, the tenth channel area CH10 of the seventh active pattern 2070 may have the second width in the first direction DR1.

In an embodiment, the second width of the 5-2 gate pattern 3050B may be greater than the first width of the 5-1 gate pattern 3050A.

Figure 9:
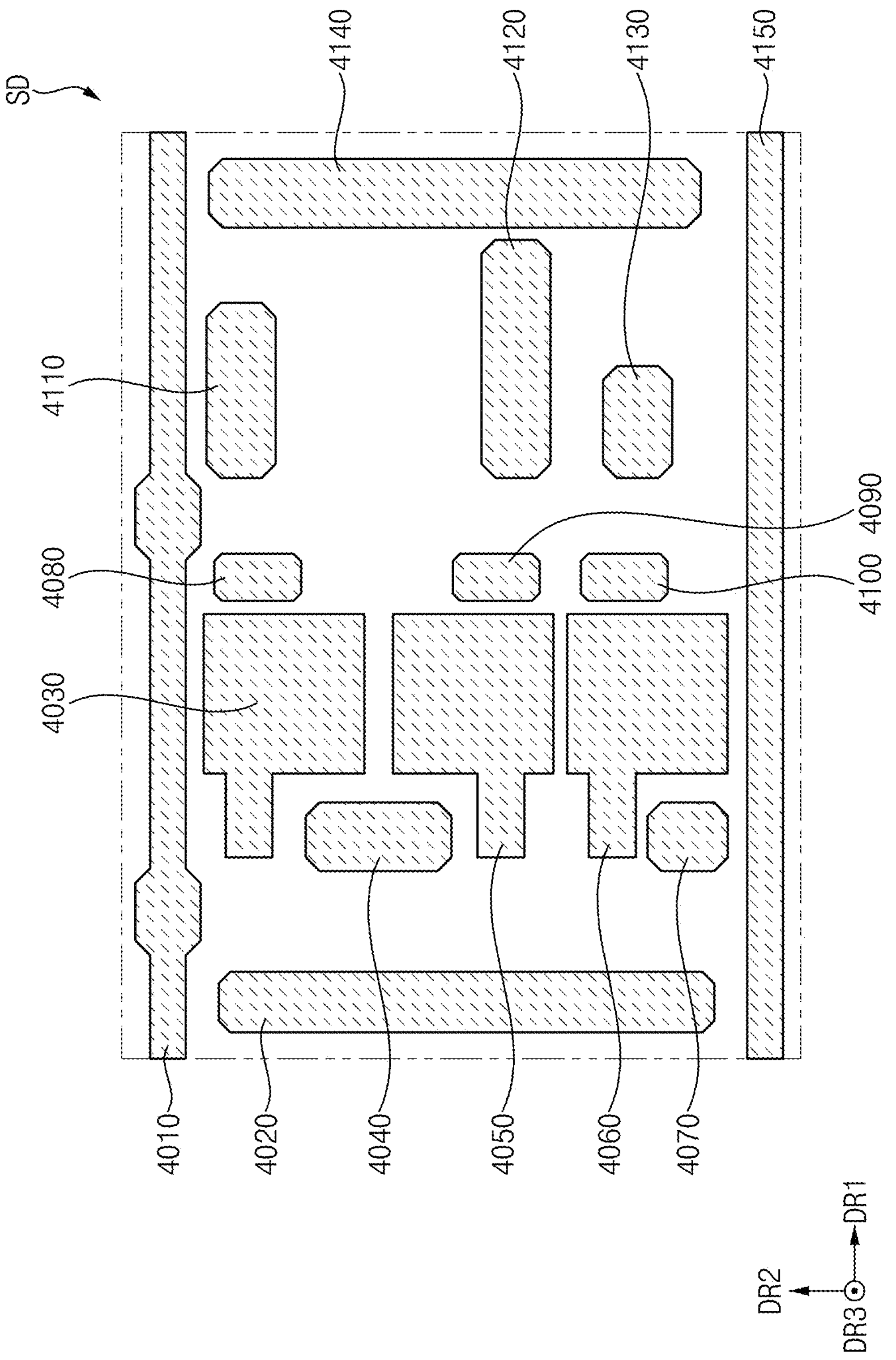
FIG. 9 is a layout illustrating a source electrode layer included in the pixel of the display device according to FIG. 1.
Figure 10:
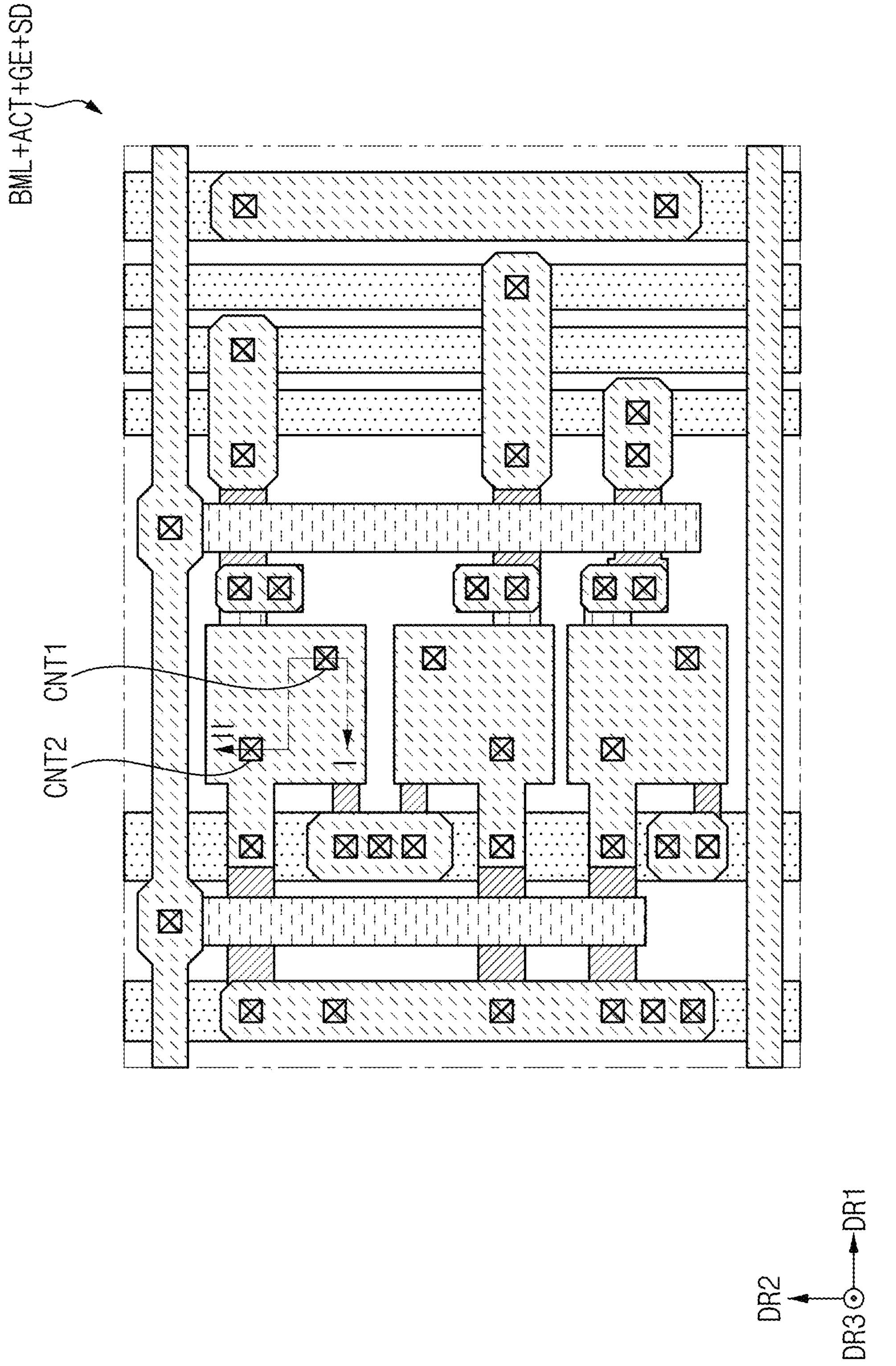
FIG. 10 is a layout illustrating the lower metal layer, the active layer, the gate layer, and the source electrode layer included in the pixel of the display device according to FIG. 1.

Referring to FIGS. 8, 9, and 10, a source electrode layer SD may be disposed on the gate layer GE. The source electrode layer SD may include a first source pattern 4010, a second source pattern 4020, a third source pattern 4030, a fourth source pattern 4040, a fifth source pattern 4050, a sixth source pattern 4060, a seventh source pattern 4070, an eighth source pattern 4080, a ninth source pattern 4090, a tenth source pattern 4100, an eleventh source pattern 4110, a twelfth source pattern 4120, a thirteenth source pattern 4130, a fourteenth source pattern 4140, and a fifteenth source pattern 4150.

Each of the first source pattern 4010 and the fifteenth source pattern 4150 may extend in the first direction DR1. The gate signal (e.g., the gate signal GS of FIG. 2) may be applied to the first source pattern 4010. Each of the second source pattern 4020 and the fourteenth source pattern 4140 may extend in the second direction DR2.

The third source pattern 4030 may be disposed adjacent to a portion of the first source pattern 4010. The fifth source pattern 4050 may be spaced apart from the third source pattern 4030 in a direction opposite to the second direction DR2. The fourth source pattern 4040 may be disposed between the third source pattern 4030 and the fifth source pattern 4050. The sixth source pattern 4060 may be spaced apart from the fifth source pattern 4050 in a direction opposite to the second direction DR2. The seventh source pattern 4070 may be disposed between the sixth source pattern 4060 and the fifteenth source pattern 4150.

The eighth source pattern 4080 may be disposed adjacent to a portion of the first source pattern 4010. In addition, the eighth source pattern 4080 may be disposed adjacent to the third source pattern 4030. For example, the eighth source pattern 4080 may be adjacent to the third source pattern 4030 in the first direction DR1.

The ninth source pattern 4090 may be disposed adjacent to the fifth source pattern 4050. For example, the ninth source pattern 4090 may be disposed adjacent to the fifth source pattern 4050 in the first direction DR1. In addition, the ninth source pattern 4090 may be spaced apart from the eighth source pattern 4080 in a direction opposite to the second direction DR2.

The tenth source pattern 4100 may be disposed adjacent to the sixth source pattern 4060. For example, the tenth source pattern 4100 may be adjacent to the sixth source pattern 4060 in the first direction DR1. In addition, the tenth source pattern 4100 may be spaced apart from the ninth source pattern 4090 in a direction opposite to the second direction DR2.

The eleventh source pattern 4110 may be disposed adjacent to a portion of the first source pattern 4010. In addition, the eleventh source pattern 4110 may be disposed between the eighth source pattern 4080 and the fourteenth source pattern 4140.

The twelfth source pattern 4120 may be disposed between the ninth source pattern 4090 and the fourteenth source pattern 4140. In addition, the twelfth source pattern 4120 may be spaced apart from the eleventh source pattern 4110 in a direction opposite to the second direction DR2.

The thirteenth source pattern 4130 may be disposed between the tenth source pattern 4100 and the fourteenth source pattern 4140. In addition, the thirteenth source pattern 4130 may be spaced apart from the twelfth source pattern 4120 in a direction opposite to the second direction DR2.

For example, the source electrode layer SD may include an alloy, a metal nitride, a conductive metal oxide, a transparent conductive material, or the like. These materials may be used alone or in combination with each other.

Examples of the metal included in the source electrode layer SD may include silver ("Ag"), molybdenum ("Mo"), aluminum ("A1"), tungsten ("W"), copper ("Cu"), nickel ("Ni"), chromium ("Cr"), titanium ("Ti"), tantalum ("Ta"), platinum ("Pt"), scandium ("Sc"), or the like. These materials may be used alone or in combination with each other.

Examples of the metal nitride included in the source electrode layer SD may include aluminum nitride ("$AlN_x$"), tungsten nitride ("$WN_x$"), chromium nitride ("$CrN_x$"), or the like. These materials may be used alone or in combination with each other.

Examples of the conductive metal oxide included in the source electrode layer SD may include indium tin oxide, indium zinc oxide, or the like. These materials may be used alone or in combination with each other.

Figure 11:
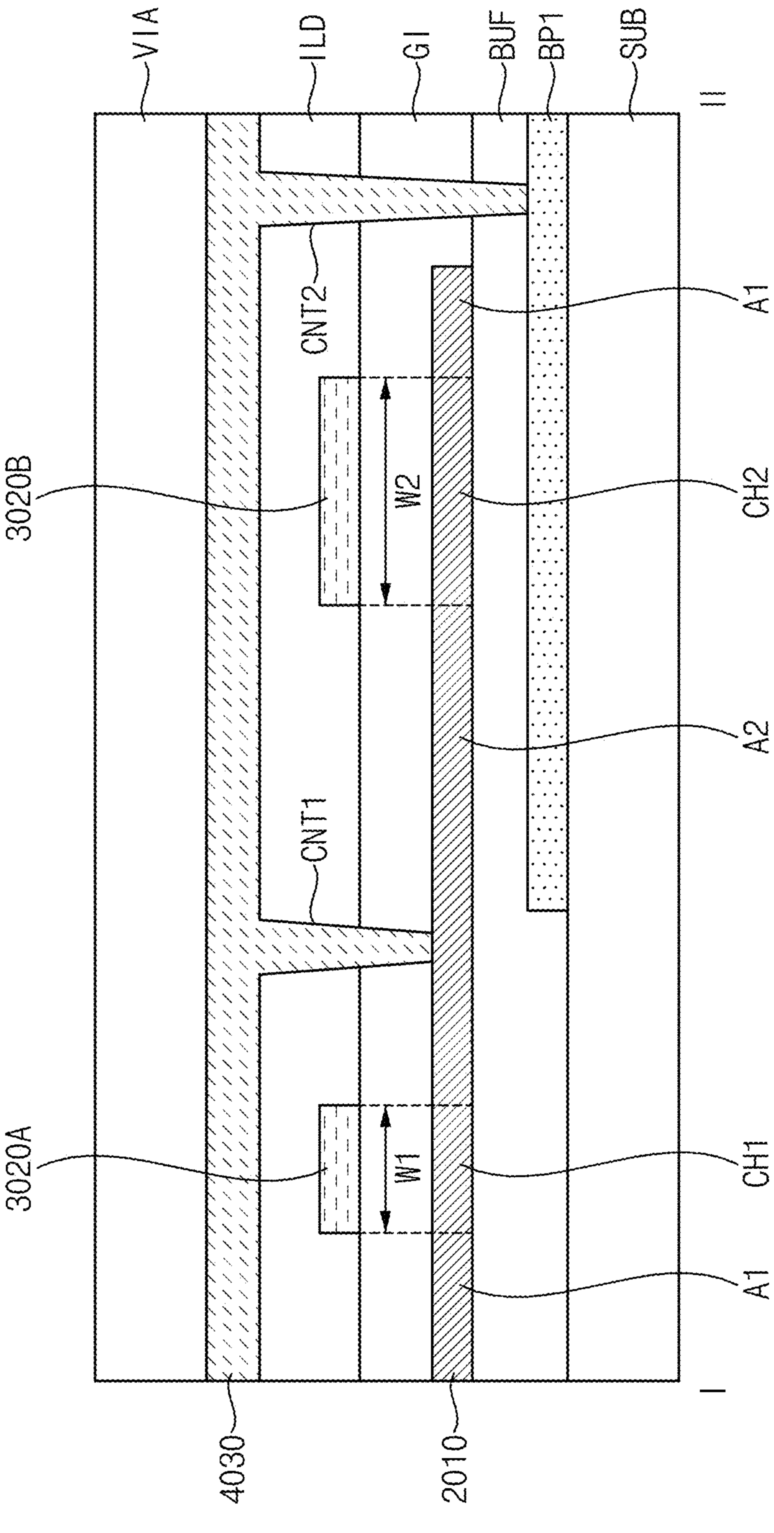
FIG. 11 is a cross-sectional view of the display device of FIG. 10 taken along a line I-II.

FIG. 11 is a cross-sectional view of the display device of FIG. 10 taken along a line I-II.

Referring to FIGS. 10 and 11, the display device (e.g., the display device DD of FIG. 1) may include a substrate SUB, a first lower metal pattern BP1, a buffer layer BUF, a first active pattern 2010, a gate insulating layer GI, a 2-1 gate pattern 3020A, a 2-2 gate pattern 3020B, an interlayer insulating layer ILD, a third source pattern 4030, and a via insulating layer VIA. The substrate SUB may include a transparent material or an opaque material. The substrate SUB may be formed of a transparent resin substrate. Example of the transparent resin substrate may include a polyimide substrate. In this case, the polyimide substrate may include a first organic layer, a first barrier layer, a second organic layer, and the like.

In an embodiment, the substrate SUB may include a quartz substrate (e.g. a synthetic quartz substrate, a fluorine-doped quartz substrate), a calcium fluoride substrate, a sodalime glass substrate, a non-alkali glass substrate, or the like. These materials may be used alone or in combination with each other.

The first lower metal pattern BP1 may be disposed on the substrate SUB. In an embodiment, the first lower metal pattern BP1 may at least partially overlap the 2-2 gate pattern 3020B in the plan view. That is, the first lower metal pattern BP1 may at least partially overlap the second gate electrode in the plan view. That is, the first lower metal pattern BP1 may overlap the second sub-driving element (e.g., the second sub-driving element T1-2 of FIG. 8) in the plan view.

In an embodiment, the first lower metal pattern BP1 may not overlap the 2-1 gate pattern 3020A in the plan view. That is, the first lower metal pattern BP1 may not overlap the first gate electrode in the plan view. That is, the first lower metal pattern BP1 may not overlap the first sub-driving element (e.g., the first sub-driving element T1-1 of FIG. 8) in the plan view.

The buffer layer BUF may be disposed on the substrate SUB. The buffer layer BUF may prevent metal atoms or impurities from diffusing from the substrate SUB to the transistor TR. In addition, the buffer layer BUF can improve the flatness of a surface of the substrate SUB when the surface of the substrate SUB is not uniform.

For example, the buffer layer BUF may include an inorganic material such as silicon oxide, silicon nitride, silicon carbide, silicon oxynitride, silicon oxycarbide, or the like. These materials may be used alone or in combination with each other.

The first active pattern 2010 may be disposed on the buffer layer BUF. As described above with reference to FIG. 5, the first active pattern 2010 may include a first area A1, a first channel area CH1, a second area A2, and a second channel area CH2.

The gate insulating layer GI may be disposed on the buffer layer BUF. The gate insulating layer GI may cover the first active pattern 2010. For example, the gate insulating layer GI may include an inorganic material such as silicon oxide, silicon nitride, silicon carbide, silicon oxynitride, silicon oxycarbide, or the like. These materials may be used alone or in combination with each other.

The 2-1 gate pattern 3020A and the 2-2 gate pattern 3020B may be disposed on the gate insulating layer GI. The 2-1 gate pattern 3020A may overlap the first channel area CH1 of the first active pattern 2010 in the plan view. The 2-2 gate pattern 3020B may overlap the second channel area CH2 of the first active pattern 2010 in the plan view.

The interlayer insulating layer ILD may be disposed on the gate insulating layer GI. The interlayer insulating layer ILD may cover the 2-1 gate pattern 3020A and the 2-2 gate pattern 3020B.

For example, the interlayer insulating layer ILD may include an inorganic material such as silicon oxide, silicon nitride, silicon carbide, silicon oxynitride, silicon oxycarbide, or the like. These materials may be used alone or in combination with each other.

The third source pattern 4030 may be disposed on the interlayer insulating layer ILD. The third source pattern 4030 may be connected to the first active pattern 2010 through a first contact hole CNT1 extending through the interlayer insulating layer ILD and the gate insulating layer GI. In addition, the third source pattern 4030 may be connected to the first lower metal pattern BP1 through a second contact hole CNT2 extending through the interlayer insulating layer ILD, the gate insulating layer GI and the buffer layer BUF.

The via insulating layer VIA may be disposed on the interlayer insulating layer ILD. The via insulating layer VIA may cover the third source pattern 4030. For example, the via insulating layer VIA may include an organic material. For example, the via insulating layer VIA may include a photoresist, a polyacrylic resin, a polyimide resin, an acrylic resin, or the like. These materials may be used alone or in combination with each other.

Referring to FIGS. 3 and 11, as described above, the second gate electrode may have the second width W2 in the first direction DR1, and the first gate electrode may have the first width W1 in the first direction DR1. The second width W2 of the second gate electrode may be greater than the first width W1 of the first gate electrode. That is, the second width W2, in the first direction, of the second channel area CH2 may be greater than the first width W1, in the first direction DR1, of the first channel area CH1.

Accordingly, a second threshold voltage of the second sub-driving element T1-2 may be greater than a first threshold voltage of the first sub-driving element T1-1. This may be due to a threshold voltage roll-off phenomenon in which the threshold voltage of the transistor (or element) including the oxide semiconductor decreases (or moves in a negative direction) as a length of the channel area of the oxide semiconductor becomes smaller.

In addition, the second sub-driving element T1-2 may overlap the first lower metal pattern BP1 in the plan view. That is, the 2-2 gate pattern 3020B and the second channel area CH2 of the first active pattern 2010 may overlap the first lower metal pattern BP1 in the plan view.

As the first lower metal pattern BP1 is disposed under the second sub-driving element T1-2 and a back-biasing voltage is applied to the first lower metal pattern BP1, the second threshold voltage of the second sub-driving element T1-2 may increase (or may move in a positive direction). That is, a sync technology (or back-biasing technology) may be applied to the second sub-driving element T1-2. For example, as the second power voltage (e.g., the second power voltage ELVSS of FIG. 3) is applied to the first lower metal pattern BP1, the second threshold voltage of the second sub-driving element T1-2 may increase. For example, as the second power voltage is applied to the first lower metal pattern BP1, a difference between the second threshold voltage of the second sub-driving element T1-2 and the first threshold voltage of the first sub-driving element T1-1 may be about 0.5 volts V.

As the second width W2 of the second channel area CH2 of the first active pattern ACT is greater than the first width W1 of the first channel area CH1 and the first lower metal pattern BP1 is disposed under the second sub-driving element T1-2, the second threshold voltage of the second sub-driving element T1-2 may be greater than the first threshold voltage of the first sub-driving element T1-1. For example, the difference between the second threshold voltage of the second sub-driving element T1-2 and the first threshold voltage of the first sub-driving element T1-1 may be greater than or equal to 0.5 volts V.

As the driving element T1 includes the first sub-driving element T1-1 and the second sub-driving element T1-2 having different threshold voltages, a driving range of the driving element T1 may be widened. As the driving range of the driving element T1 becomes wider, a range of the variation in driving current in response to a driving voltage of the driving element T1 becomes greater. Accordingly, a gradation expression of the display device (for example, the display device DD of FIG. 1) may be more easily achieved.

In an embodiment, the difference between the second threshold voltage of the second sub-driving element T1-2 and the first threshold voltage of the first sub-driving element T1-1 may be less than or equal to 3 volts V. This may be because a difference between a data voltage corresponding to highest gradation level (i.e., a white data voltage) and a data voltage corresponding to a lowest gradation level (i.e., a black data voltage) is less than or equal to 3 volts V. However, this disclosure is not limited thereto, and the difference between the second threshold voltage of the second sub-driving element T1-2 and the first threshold voltage of the first sub-driving element T1-1 may be greater than or equal to 3 volts V.

Figure 12:
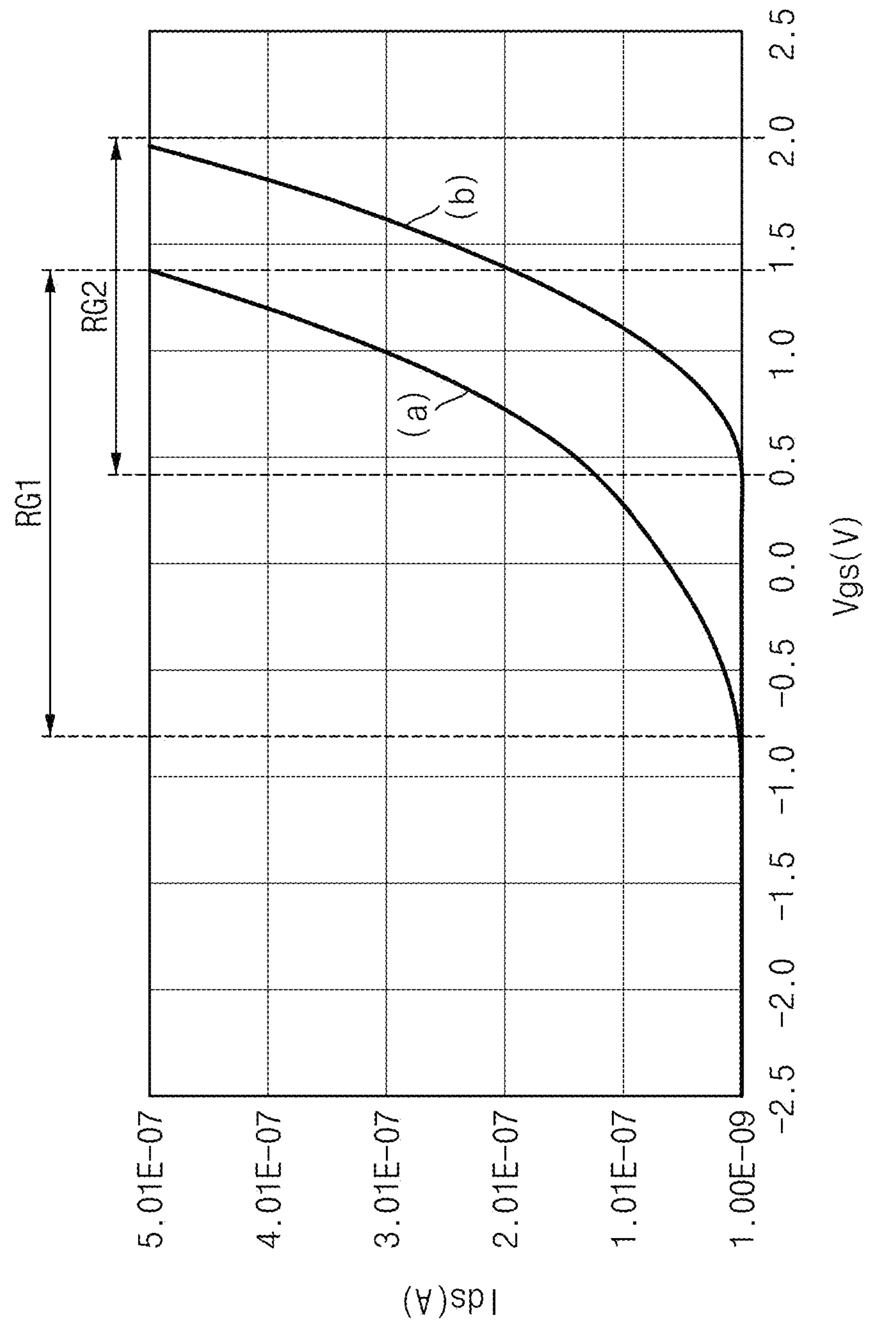
FIG. 12 is a diagram illustrating graphs representing a driving current in response to a driving voltage of a driving element.

FIG. 12 is a diagram illustrating graphs representing a driving current in response to a driving voltage of a driving element.

Specifically, a graph (b) in FIG. 12 illustrates a driving current in response to a driving voltage of a driving element included in a display device according to a comparative example, and a graph (a) in FIG. 12 illustrates a driving current in response to a driving voltage of a driving element included in the display device according to an embodiment.

A horizontal axis of the graph of FIG. 12 may represent a gate-source voltage Vgs of a driving element. The unit of the gate-source voltage Vgs may be volt V. A vertical axis of the graph of FIG. 12 may represent a driving current Ids of the driving element. The unit of the driving current Ids may be ampere A.

Referring to FIG. 12, a display device according to the comparative example may be different from the display device (for example, the display device DD of FIG. 1) according to an embodiment in terms of a driving element. The display device according to the comparative example may include a single driving element. The display device according to an embodiment may include two driving elements (i.e., the first sub-driving element T1-1 and the second sub-driving element T1-2 of FIG. 3).

As shown in the graph (b) in FIG. 12, a driving range RG2 of the driving element included in the display device according to the comparative example may be about 1.6 volts. That is, a difference in driving voltage corresponding to a minimum value and a maximum value of driving current of the driving element included in the display device according to the comparative example may be about 1.6 volts.

As depicted in the graph (a) in FIG. 12, a driving range RG1 of the driving element (e.g., the first sub-driving element T1 of FIG. 3) included in the display device according to an embodiment may be about 2.2 volts. That is, a difference in driving voltage corresponding to a minimum value and a maximum value of driving current of the driving element included in the display device according to an embodiment may be about 2.2 volts.

Figure 13:
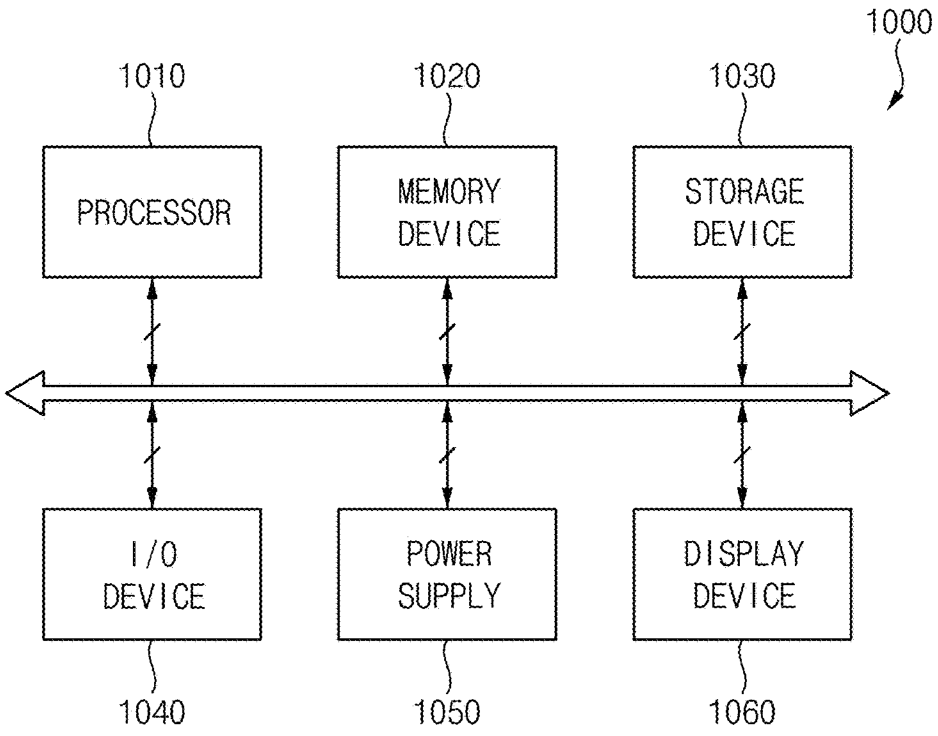
FIG. 13 is a block diagram illustrating an electronic device according to embodiments.
Figure 14:
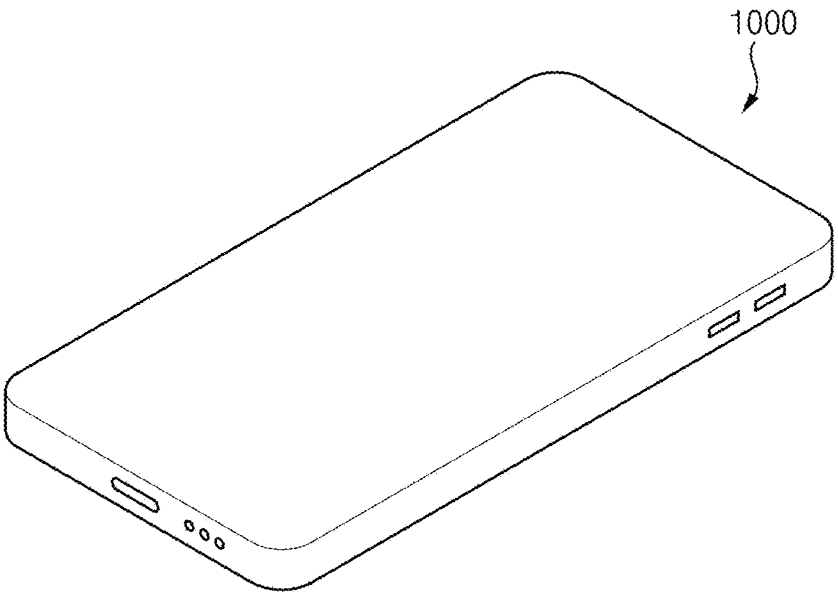
FIG. 14 is a diagram illustrating an example in which the electronic device of FIG. 13 is implemented as a smart phone.

FIG. 13 is a block diagram illustrating an electronic device according to embodiments. FIG. 14 is a diagram illustrating an example in which the electronic device of FIG. 13 is implemented as a smart phone.

Referring to FIGS. 13 and 14, an electronic device 1000 may include a processor 1010, a memory device 1020, a storage device 1030, an input/output device 1040, a power supply 1050, and a display device 1060. In this case, the display device 1060 may be the display device DD of FIG. 1. In addition, the electronic device 1000 may further include several ports capable of communicating with a video card, a sound card, a memory card, a USB device, and/or the like.

According to an embodiment, as illustrated in the FIG. 14, the electronic device 1000 may be implemented as a smartphone. However, this is exemplary, and the electronic device 1000 may be implemented as various devices according to embodiments. For example, the electronic device 1000 may be implemented as a mobile phone, a video phone, a smart pad, a smart watch, a tablet PC, a vehicle navigation device, a computer monitor, a notebook computer, a head mounted display device, and/or the like.

The processor 1010 may be a microprocessor, a central processing unit, an application processor, and/or the like. The processor 1010 may be connected to other components through an address bus, a control bus, a data bus, and/or the like. In an embodiment, the processor 1010 may also be connected to an expansion bus such as a peripheral component interconnect ("PCI") bus.

The memory device 1020 may store data necessary for operation of the electronic device 1000. For example, the memory device 1020 may include a nonvolatile memory device and/or a volatile memory device. Examples of the nonvolatile memory device may include erasable programmable read-only Memory ("EPROM") device, electrically erasable programmable read-only memory ("EEPROM") device, flash memory device, phase change random access memory ("PRAM") device, resistance random access memory ("RRAM") device, nano floating gate memory ("NFGM") device, polymer random access memory ("PoRAM") device, magnetic random access memory ("MRAM") device, ferroelectric random access memory ("FRAM") device, and/or the like. Example of the volatile memory device may include dynamic random access memory ("DRAM") device, static random access memory ("SRAM") device, mobile DRAM device, and/or the like.

The storage device 1030 may include a solid state drive ("SSD"), a hard disk drive ("HDD"), a CD-ROM, and/or the like.

The input/output device 1040 may include an input mean such as a keyboard, a keypad, a touch pad, a touch screen, and a mouse, and/or the like, and an output mean such as a speaker and a printer. In an embodiment, the display device 1060 may be included in the input/output device 1040.

The power supply 1050 may supply power necessary for operation of the electronic device 1000. For example, the power supply 1050 may supply power necessary for operation of the display device 1060.

The display device 1060 may be connected to other components through buses or other communication links.

The present disclosure can be applied to various display devices. For example, the present disclosure is applicable to various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed herein, and that modifications to the disclosed embodiments, as well as other embodiments, are intended to be included within the scope of the appended claims.

What is claimed is:

1. A display device comprising:

a light emitting element; and a driving element connected to the light emitting element and applying a driving current to the light emitting element, wherein the driving element includes:

a first sub-driving element including an active pattern, and a first gate electrode; and a second sub-driving element including the active pattern, a second gate electrode, and a lower metal pattern disposed under the second gate electrode, wherein the active pattern includes a first area, a first channel area overlapping the first gate electrode in a plan view, and a second channel area overlapping the second gate electrode in a plan view, and wherein a first width of the first gate electrode in a direction in which the first channel areas is in contact with the first area is different from a second width of the second gate electrode in a direction in which the second channel area is in contact with the first area.

2. The display device of claim 1, wherein the second width of the second gate electrode is greater than the first width of the first gate electrode.

3. The display device of claim 1, wherein the active pattern is disposed under the first gate electrode.

4. The display device of claim 1, wherein the active pattern is disposed between the second gate electrode and the lower metal pattern.

5. The display device of claim 1, wherein the lower metal pattern does not overlap the first gate electrode in a plan view.

6. The display device of claim 1, wherein a threshold voltage of the second sub-driving element is greater than a threshold voltage of the first sub-driving element.

7. The display device of claim 6, wherein a difference between the threshold voltage of the second sub-driving element and the threshold voltage of the first sub-driving element is equal to or greater than about 0.5 volts (V) and equal to or less than about 3 volts V.

8. The display device of claim 1, wherein the first sub-driving element and the second sub-driving element are connected in parallel.

9. The display device of claim 1, further comprising:

a source pattern disposed on the first gate electrode and the second gate electrode, wherein the lower metal pattern is connected to the source pattern through a contact hole.

10. The display device of claim 9, wherein the first channel area is in contact with the first area in a first direction, and the second channel area is in contact with the first area in the first direction.

11. A display device comprising:

a lower metal pattern;

an active pattern disposed on the lower metal pattern, including:

a first channel area;

a second channel area spaced apart from the first channel area in a plan view; and a first area in contact with the first channel area and the second channel area;

a first gate electrode disposed on the active pattern and overlapping the first channel area in a plan view; and a second gate electrode disposed on the active pattern and overlapping the second channel area in a plan view, wherein a first width of the first channel area in a direction in which the first channel area is in contact with the first area is different from a second width of the second channel area in a direction in which the second channel area is in contact with the first area.

12. The display device of claim 11, wherein the second gate electrode overlaps the lower metal pattern in a plan view.

13. The display device of claim 12, wherein the first gate electrode does not overlap the lower metal pattern in a plan view.

14. The display device of claim 13, wherein the second width of the second channel area is greater than the first width of the first channel area.

15. The display device of claim 14, wherein the active pattern further includes:

a second area in contact with the first channel area and the second channel area, the second area being spaced apart from the first area in a plan view.

16. The display device of claim 15, further comprising:

a first sub-driving element, wherein the first sub-driving element includes:

the first channel area of the active pattern;
a portion of the first area of the active pattern;
a portion of the second area of the active pattern; and
the first gate electrode.

17. The display device of claim 16, further comprising:
a second sub-driving element,
wherein the second sub-driving element includes:
the second channel area of the active pattern;
a portion of the first area of the active pattern;
a portion of the second area of the active pattern;
the second gate electrode; and
a portion of the lower metal pattern overlapping the second gate electrode in a plan view.

18. The display device of claim 17, wherein a threshold voltage of the second sub-driving element is greater than a threshold voltage of the first sub-driving element.

19. The display device of claim 18, wherein a difference between the threshold voltage of the second sub-driving element and the threshold voltage of the first sub-driving element is equal to or greater than about 0.5 volts (V) and equal to or less than about 3 volts V.

20. The display device of claim 11, wherein the first channel area is in contact with the first area in a first direction,
the second channel area is in contact with the first area in the first direction, and a width of the second gate electrode in the first direction is greater than a width of the first gate electrode in the first direction.

21. An electronic device comprising:
a display device including:
a light emitting element; and
a driving element connected to the light emitting element and applying a driving current to the light emitting element, wherein the driving element includes a first sub-driving element including an active pattern and a first gate electrode, and a second sub-driving element including the active pattern, a second gate electrode, and a lower metal pattern disposed under the second gate electrode; and
a memory device configured to store data,
wherein the active pattern includes a first area, a first channel area overlapping the first gate electrode in a plan view, and a second channel area overlapping the second gate electrode in a plan view, and
wherein a first width of the first gate electrode in a direction in which the first channel area is in contact with the first area is different from a second width of the second gate electrode in a direction in which the second channel area is in contact with the first area.

* * * * *